(12) United States Patent
Kim

(10) Patent No.: US 10,495,284 B2
(45) Date of Patent: Dec. 3, 2019

(54) LENS AND LIGHT EMITTING UNIT INCLUDING SAME

(71) Applicant: LG INNOTEK CO., LTD., Seoul (KR)

(72) Inventor: Ki Hyun Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 15/758,096

(22) PCT Filed: Aug. 23, 2016

(86) PCT No.: PCT/KR2016/009295
§ 371 (c)(1),
(2) Date: Mar. 7, 2018

(87) PCT Pub. No.: WO2017/043782
PCT Pub. Date: Mar. 16, 2017

(65) Prior Publication Data
US 2018/0252386 A1 Sep. 6, 2018

(30) Foreign Application Priority Data

Sep. 8, 2015 (KR) .................. 10-2015-0126789
Sep. 8, 2015 (KR) .................. 10-2015-0126790

(51) Int. Cl.
*F21V 5/04* (2006.01)
*G02B 3/00* (2006.01)
(Continued)

(52) U.S. Cl.
CPC .............. *F21V 5/04* (2013.01); *F21K 9/60* (2016.08); *F21V 7/04* (2013.01); *G02B 3/00* (2013.01);
(Continued)

(58) Field of Classification Search
CPC ..... F21V 5/04; F21V 7/04; F21V 5/00; F21V 5/046; F21V 5/048; F21V 5/08;
(Continued)

(56) References Cited

U.S. PATENT DOCUMENTS 8,016,460 B2 9/2011 Huang et al.
2006/0083000 A1 4/2006 Yoon et al.
(Continued)

FOREIGN PATENT DOCUMENTS

JP 2015-517199 A 6/2015
KR 10-0726160 B1 6/2007
(Continued)

OTHER PUBLICATIONS

Written Opinion of the International Searching Authority (PCT/ISA/237) issued in PCT/KR2016/009295, dated Nov. 28, 2016.
(Continued)

*Primary Examiner* — Bao Q Troung
*Assistant Examiner* — Jessica M Apenteng
(74) *Attorney, Agent, or Firm* — Birch, Stewart, Kolasch & Birch, LLP

(57) ABSTRACT

An embodiment provides a lens comprising: a lens body; and a cavity disposed in the lens body, wherein the outer surface of the lens body comprises a first side surface forming an acute angle with respect to the bottom surface and slopping toward a central axis thereof, an upper surface including a flat area, and an inflection part disposed between the side surface and the upper surface.

20 Claims, 19 Drawing Sheets

(51) Int. Cl.
*F21K 9/60* (2016.01)
*F21V 7/04* (2006.01)
*G02B 19/00* (2006.01)

(52) U.S. Cl.
CPC ..... *G02B 19/0014* (2013.01); *G02B 19/0061* (2013.01)

(58) Field of Classification Search
CPC .. F21K 9/60; F21K 99/00; G02B 3/00; G02B 19/0014; G02B 19/0061; G02B 2003/0093; G02B 3/02
USPC ........................................................ 362/326
See application file for complete search history.

(56) References Cited

U.S. PATENT DOCUMENTS

2013/0229810 A1  9/2013  Pelka et al.

| | | | |
|---|---|---|---|
| 2015/0354786 A1* | 12/2015 | Ji | F21V 5/04 315/297 |
| 2016/0146430 A1* | 5/2016 | Yeh | G02F 1/133603 362/308 |
| 2017/0074484 A1* | 3/2017 | Ha | F21V 5/048 |

FOREIGN PATENT DOCUMENTS

| KR | 10-2011-0128434 A | 11/2011 |
|---|---|---|
| KR | 10-1080355 B1 | 11/2011 |
| KR | 10-1235345 B1 | 2/2013 |
| KR | 10-2013-0073328 A | 7/2013 |
| KR | 10-2014-0040559 A | 4/2014 |

OTHER PUBLICATIONS

International Search Report (PCT/ISA/210) issued in PCT/KR2016/009295, dated Nov. 28, 2016.

* cited by examiner

[FIG. 1a]
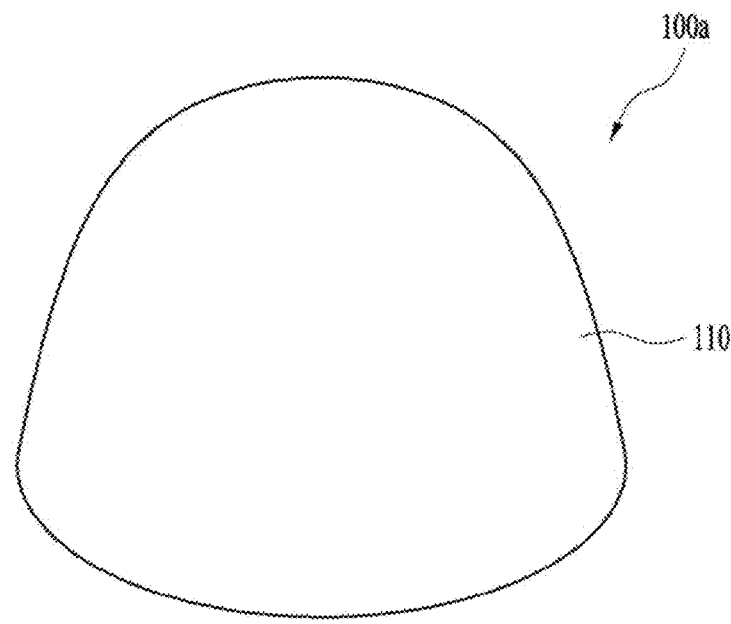
[FIG. 1b]
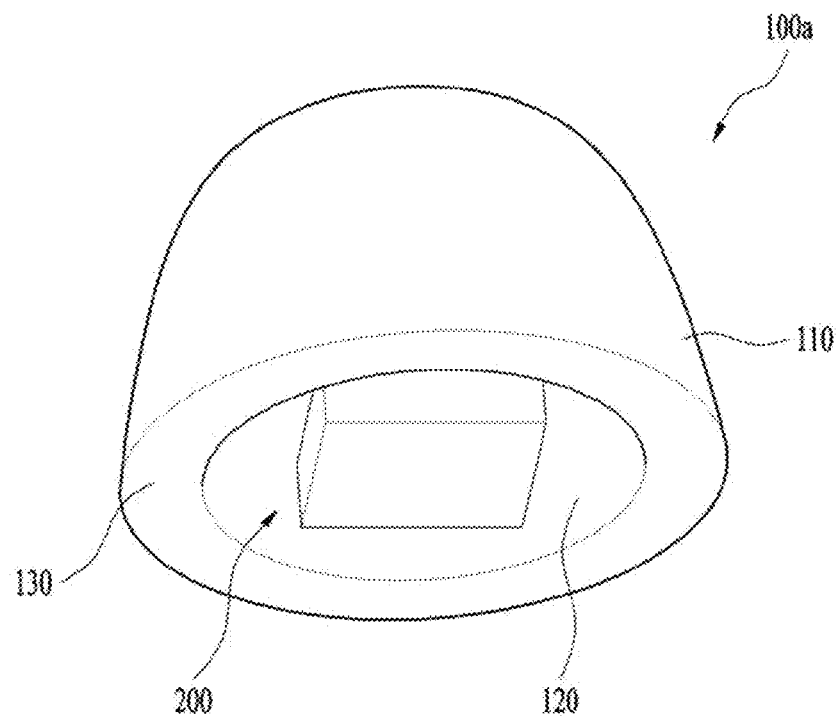

[FIG. 2a]
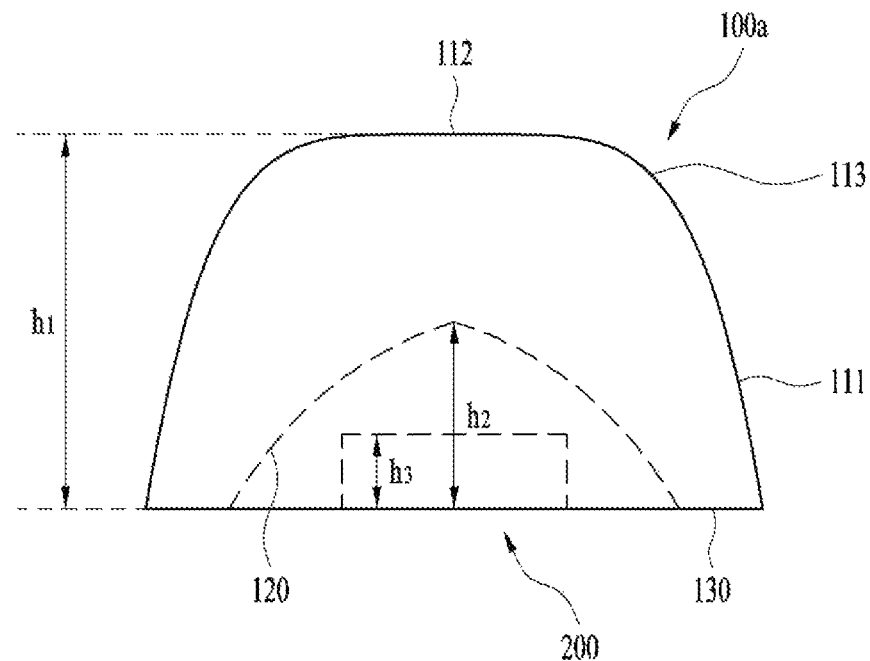
[FIG. 2b]
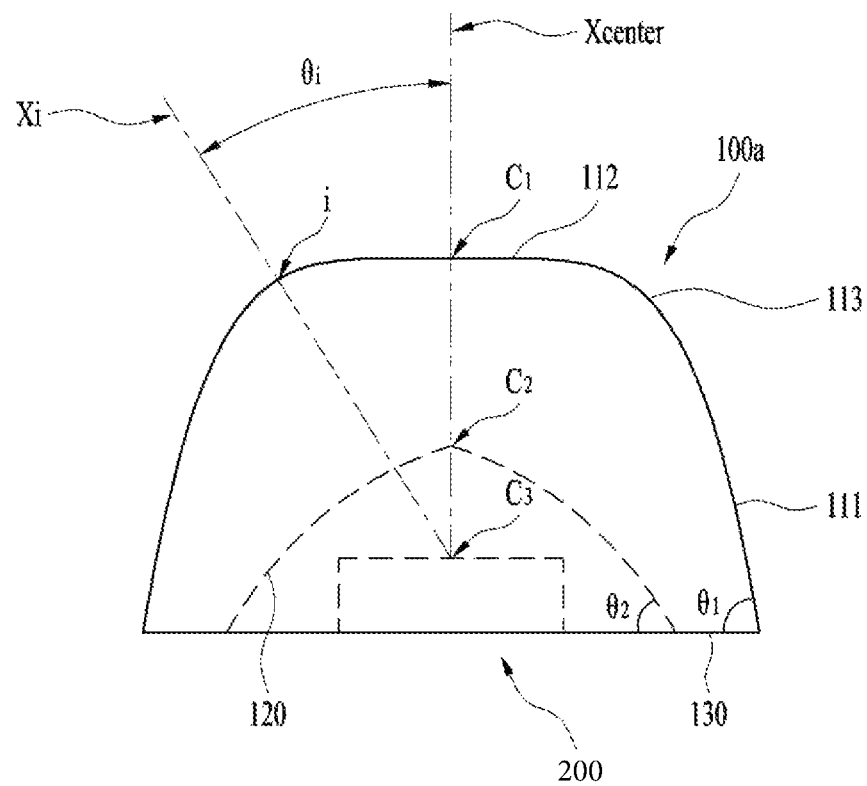

[FIG. 3]
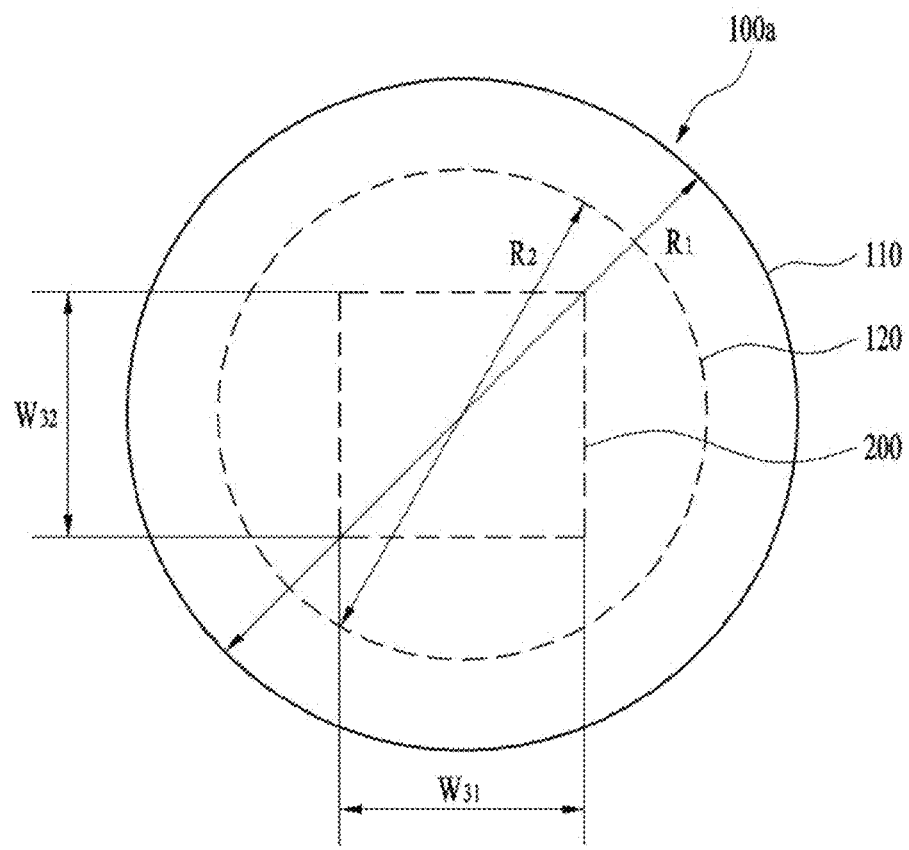
[FIG. 4a]
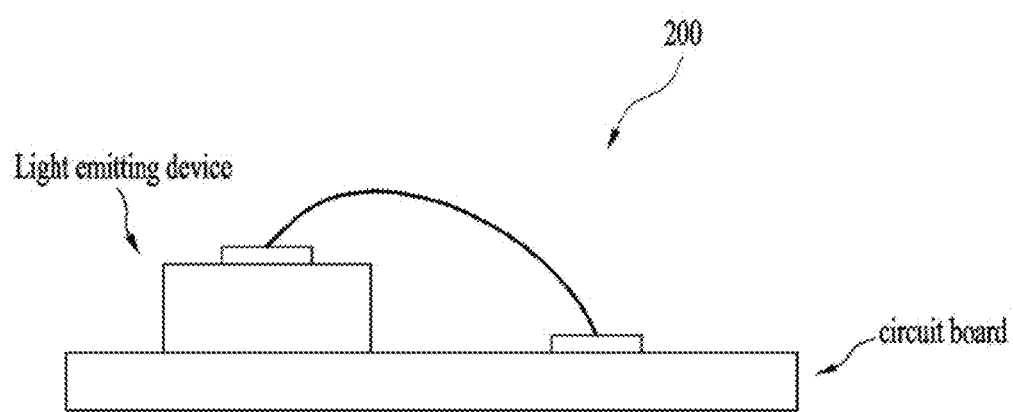

[FIG. 4b]
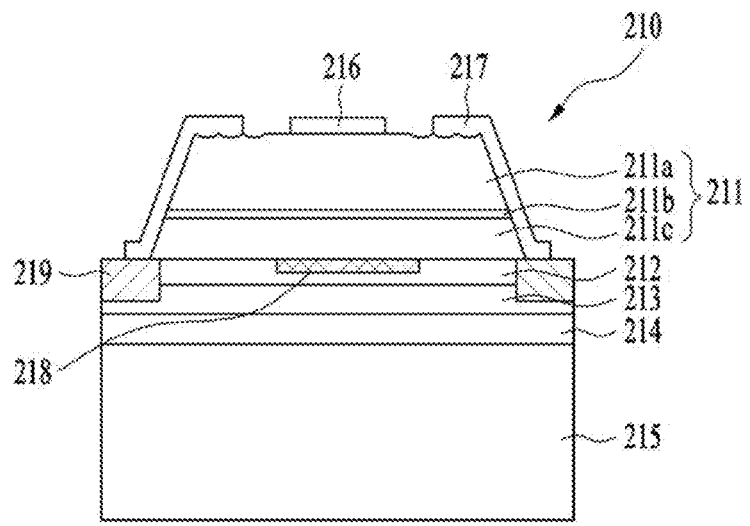
[FIG. 5a]
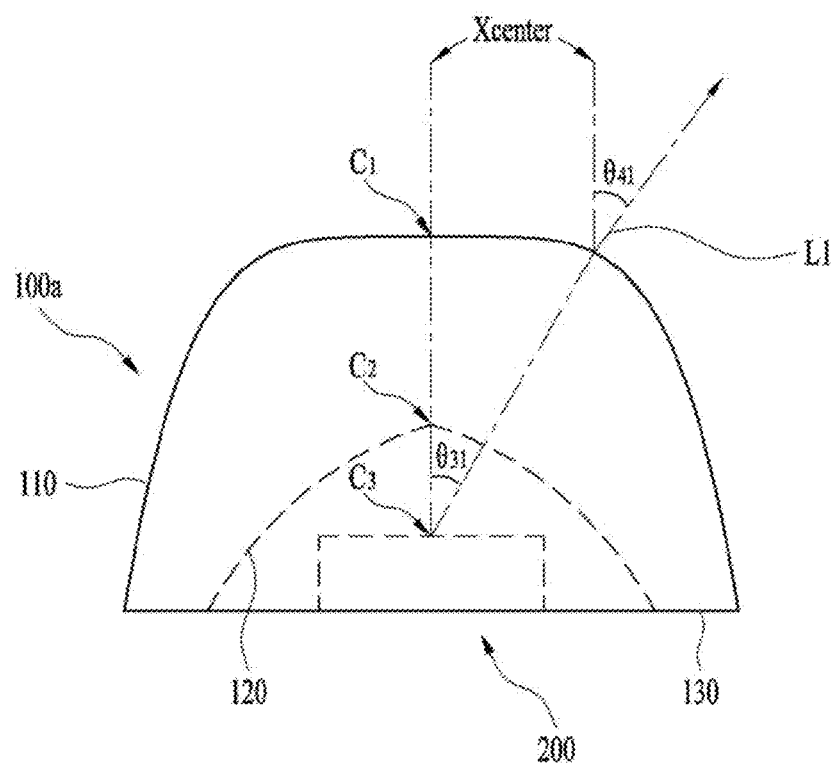

【FIG. 5b】
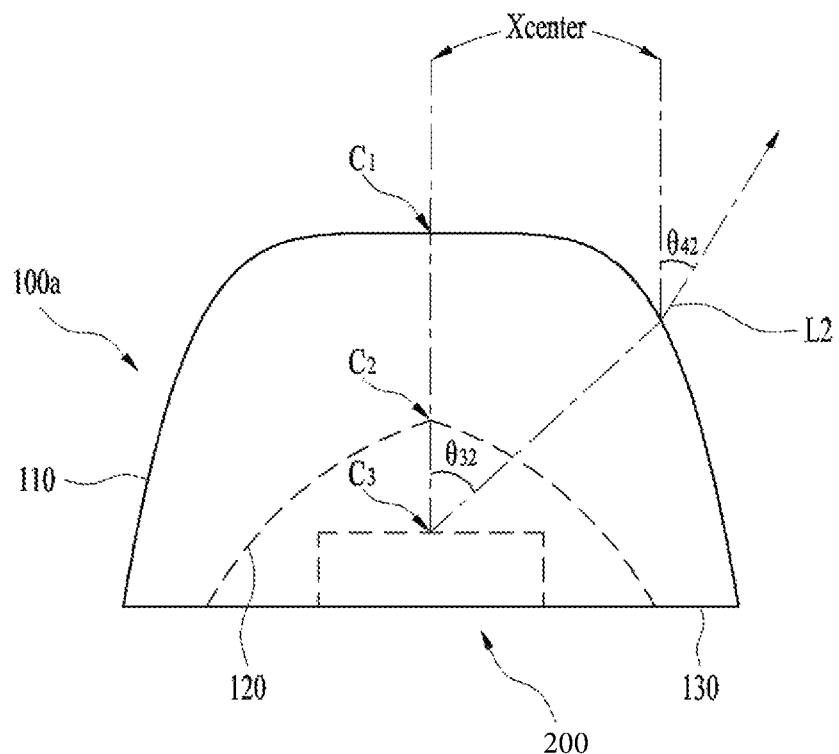
【FIG. 6】
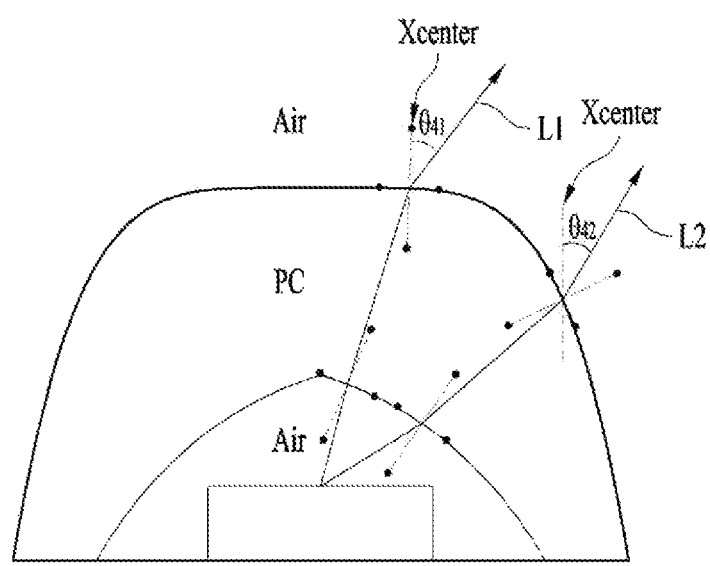

[FIG. 7a]
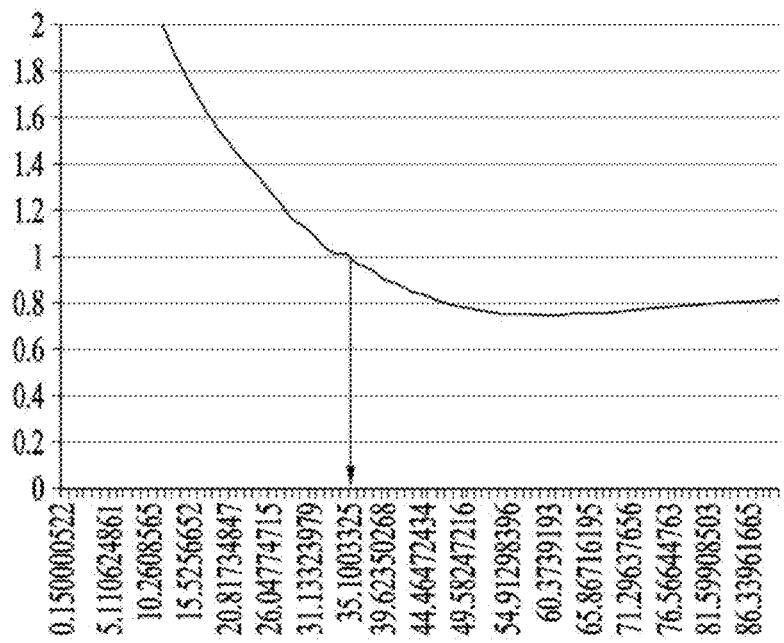
[FIG. 7b]
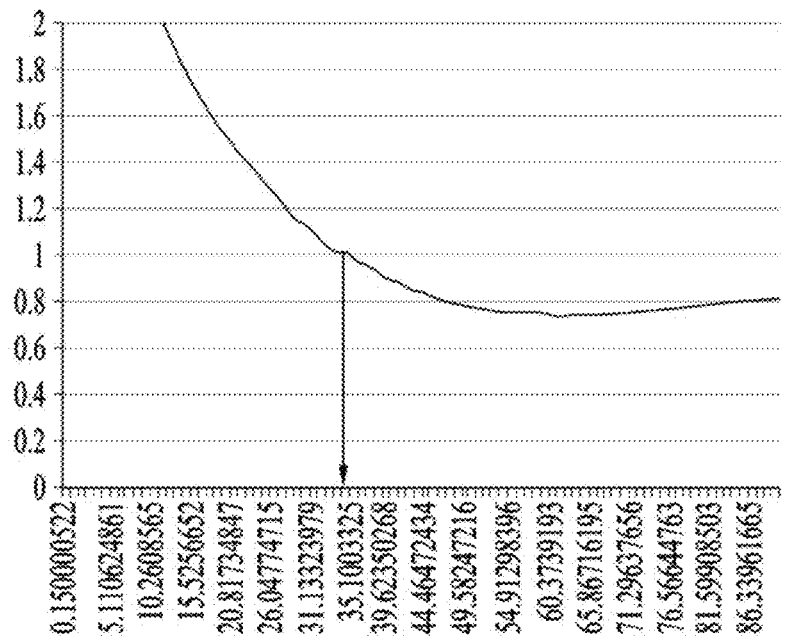

[FIG. 8a]
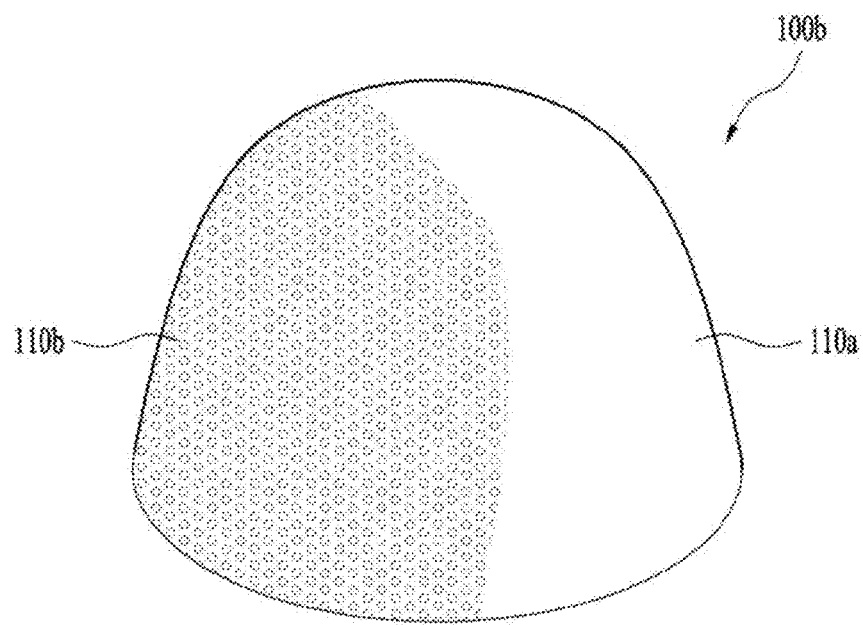
[FIG. 8b]
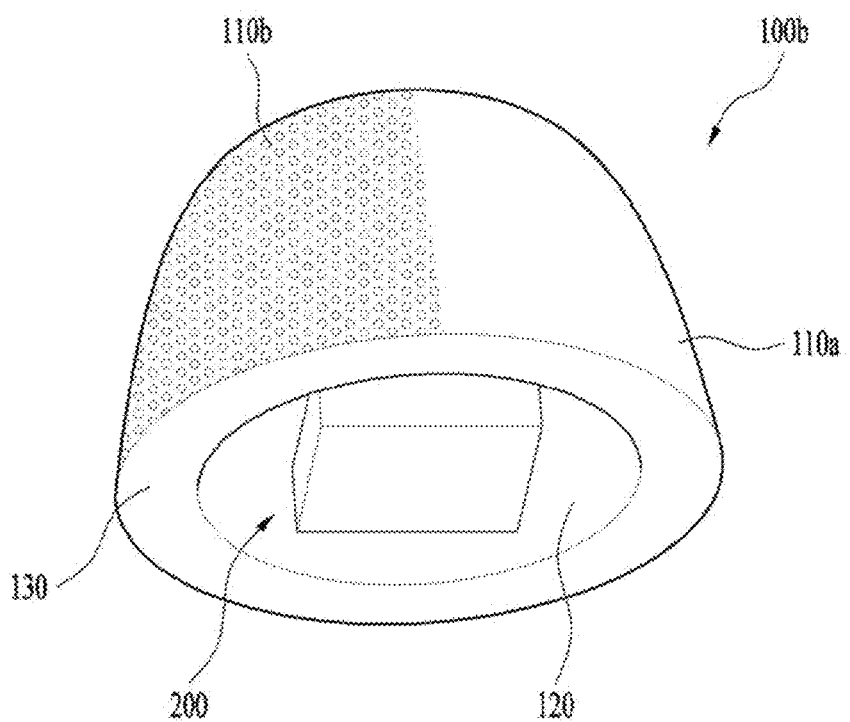

[FIG. 9a]
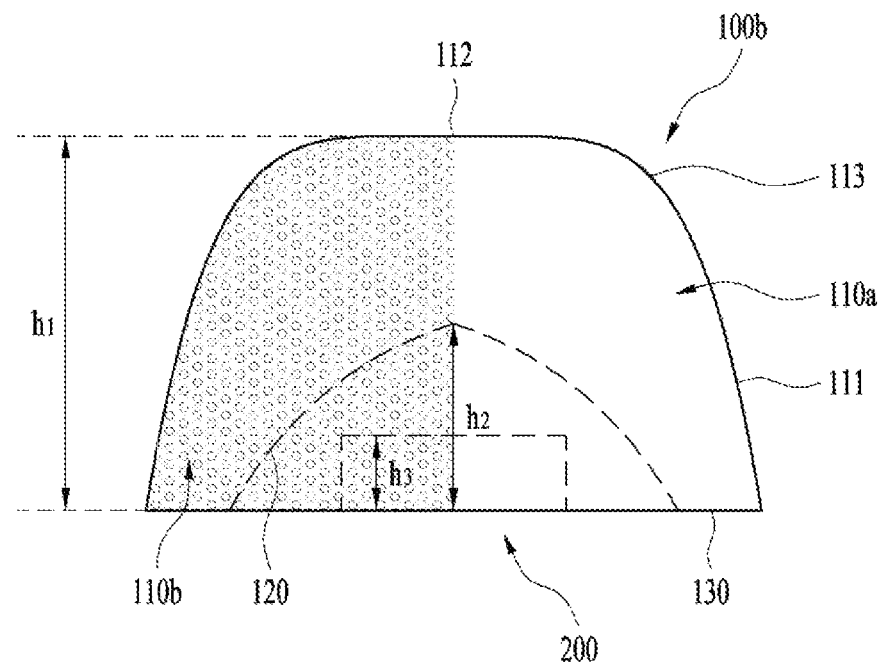
[FIG. 9b]
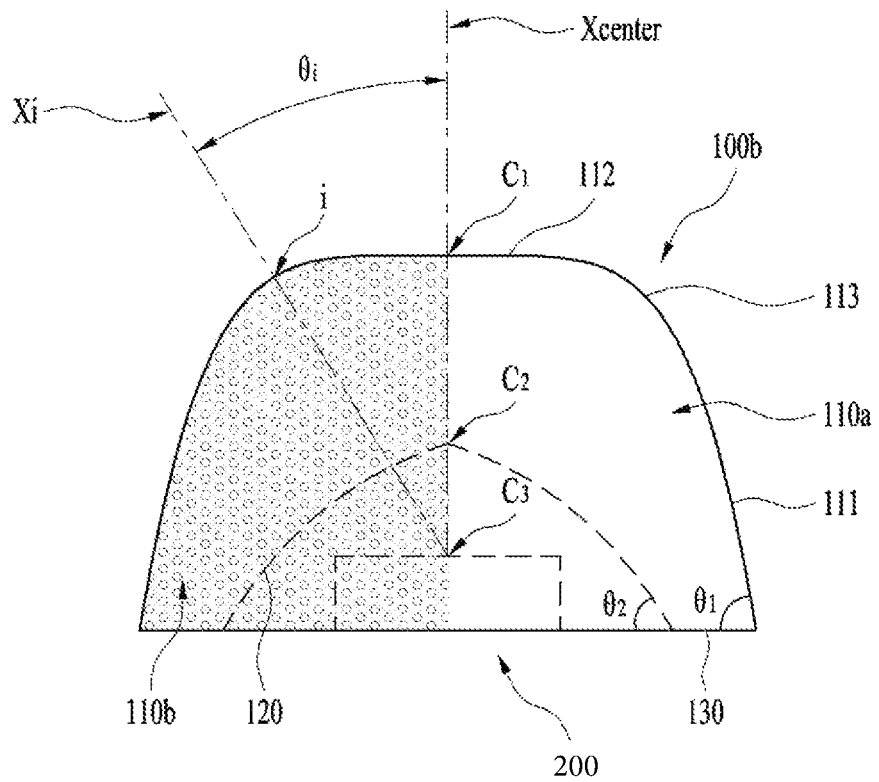

[FIG. 10]
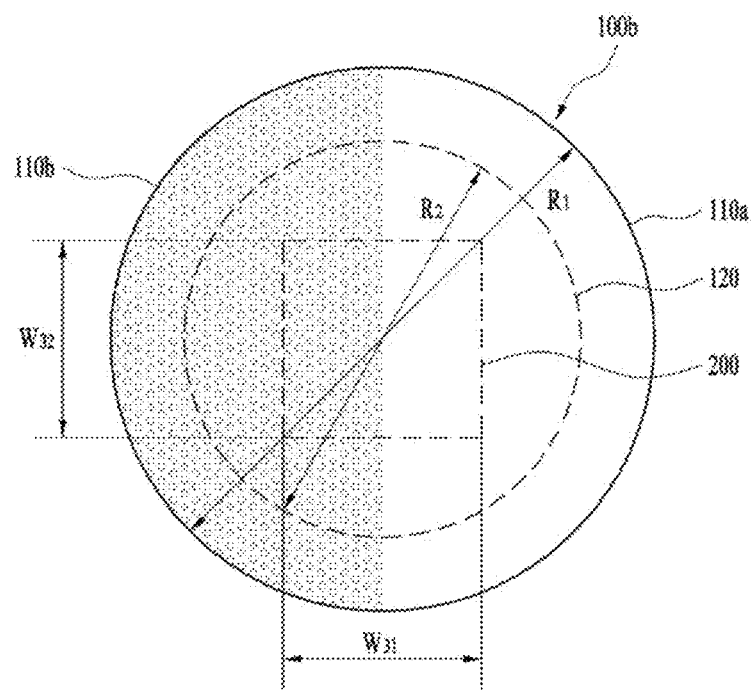
[FIG. 11a]
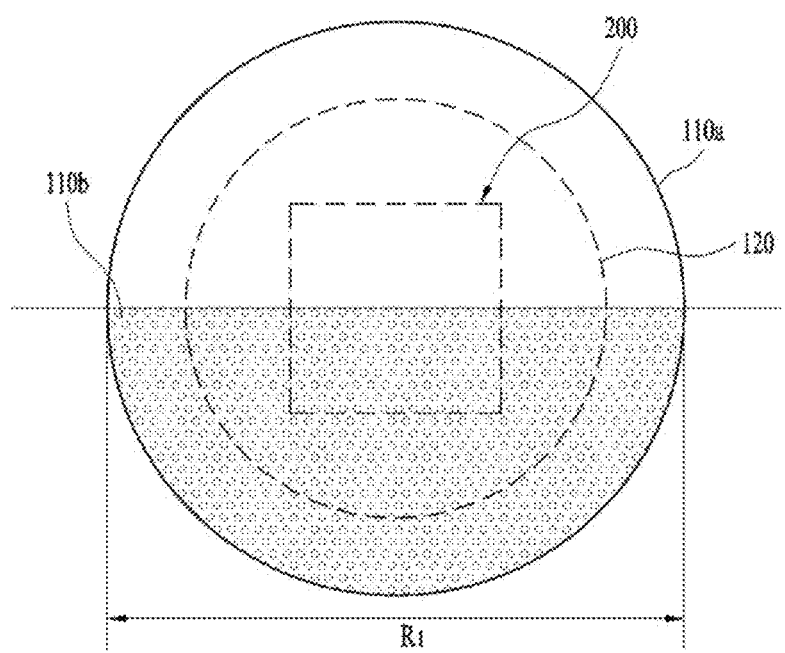

[FIG. 11b]
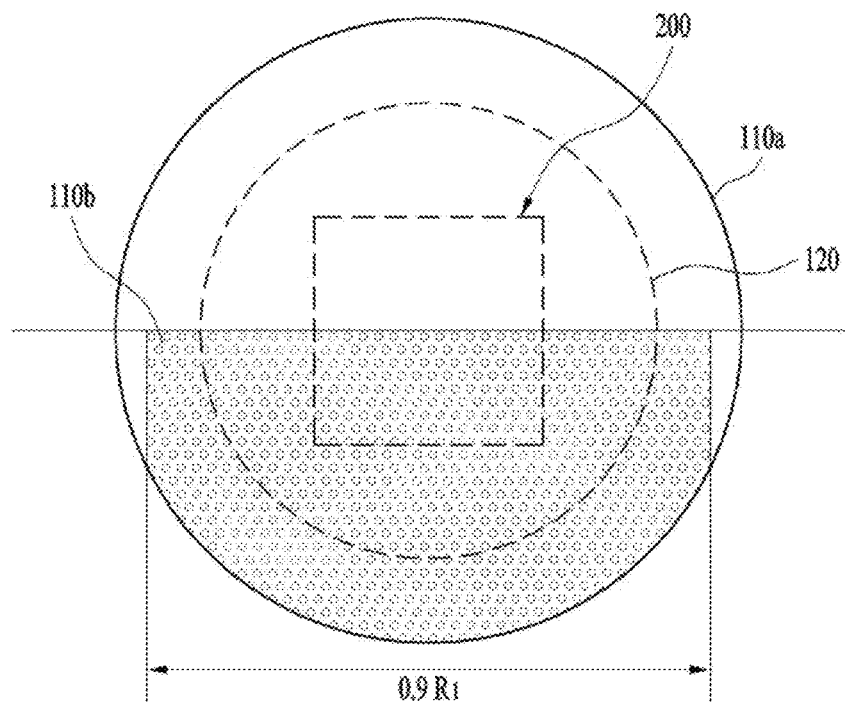
[FIG. 11c]
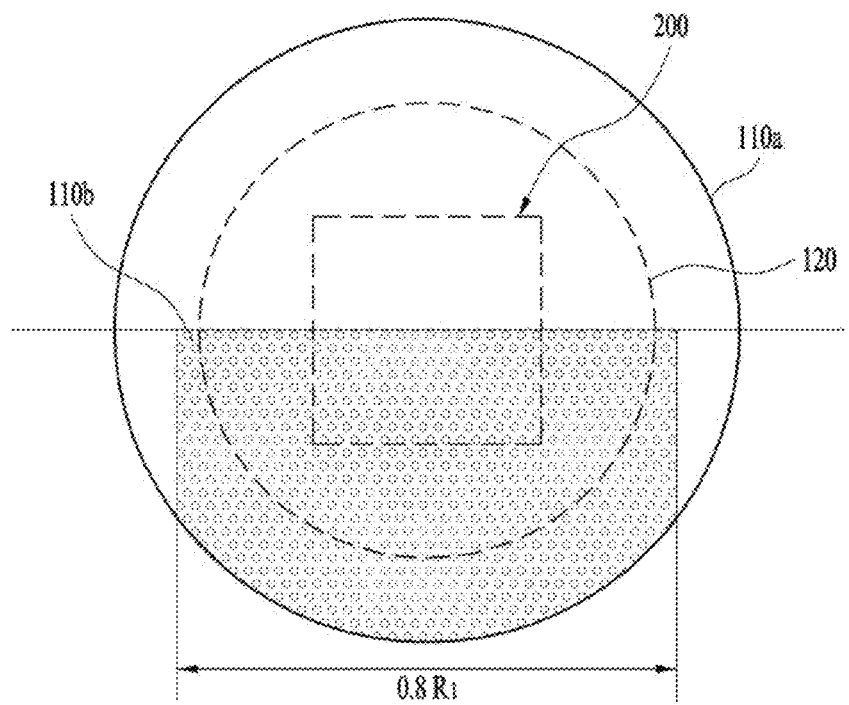

[FIG. 11d]
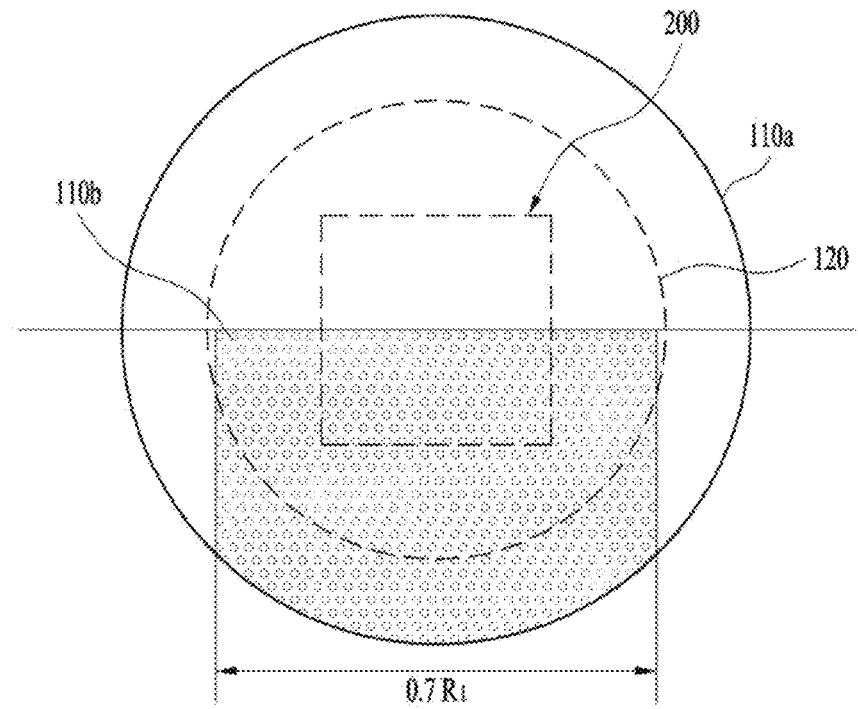
[FIG. 11e]
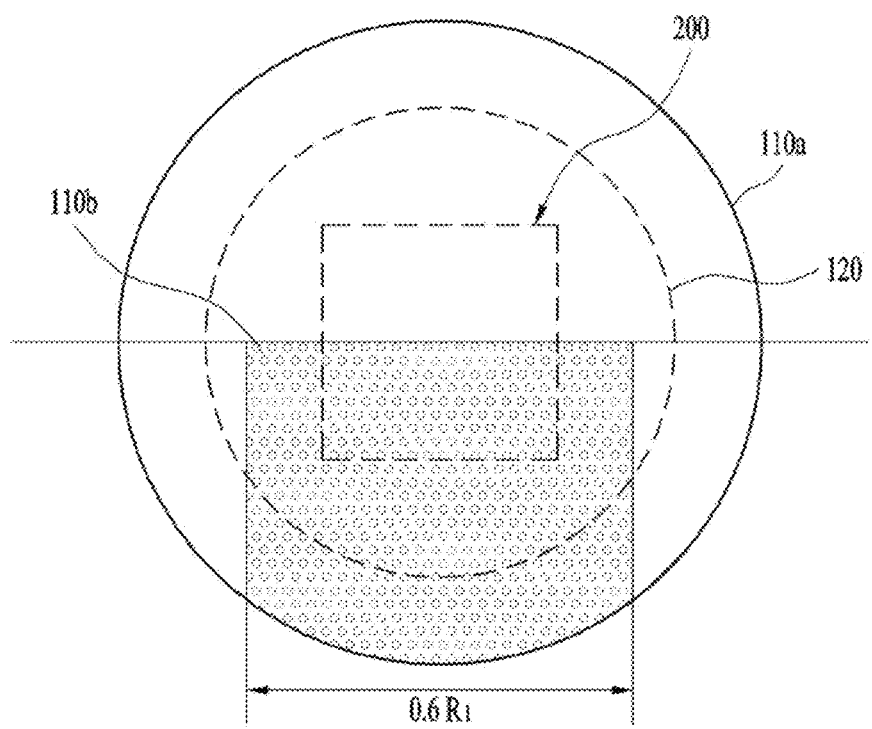

[FIG. 11f]
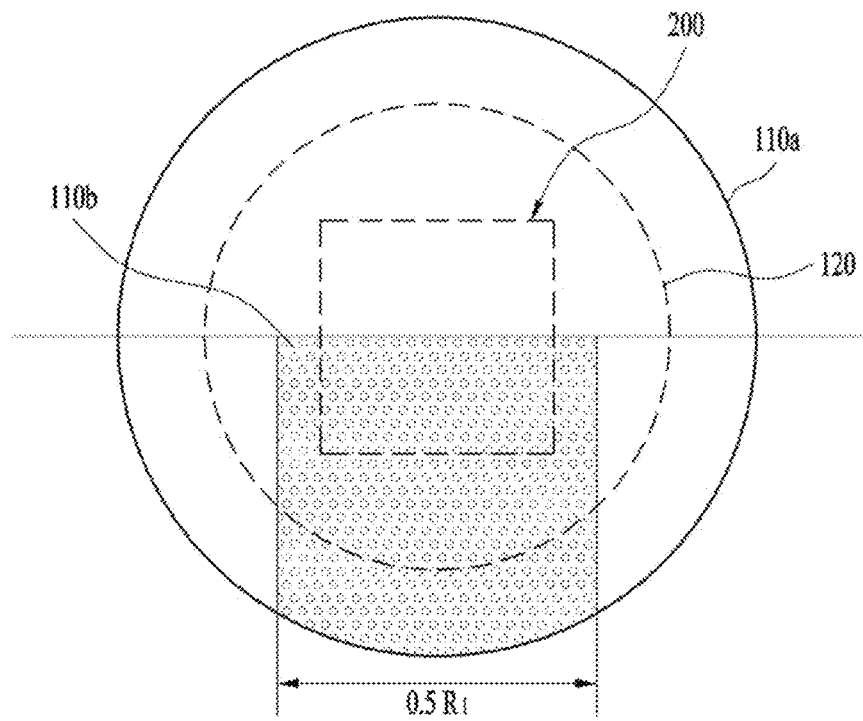
[FIG. 11g]
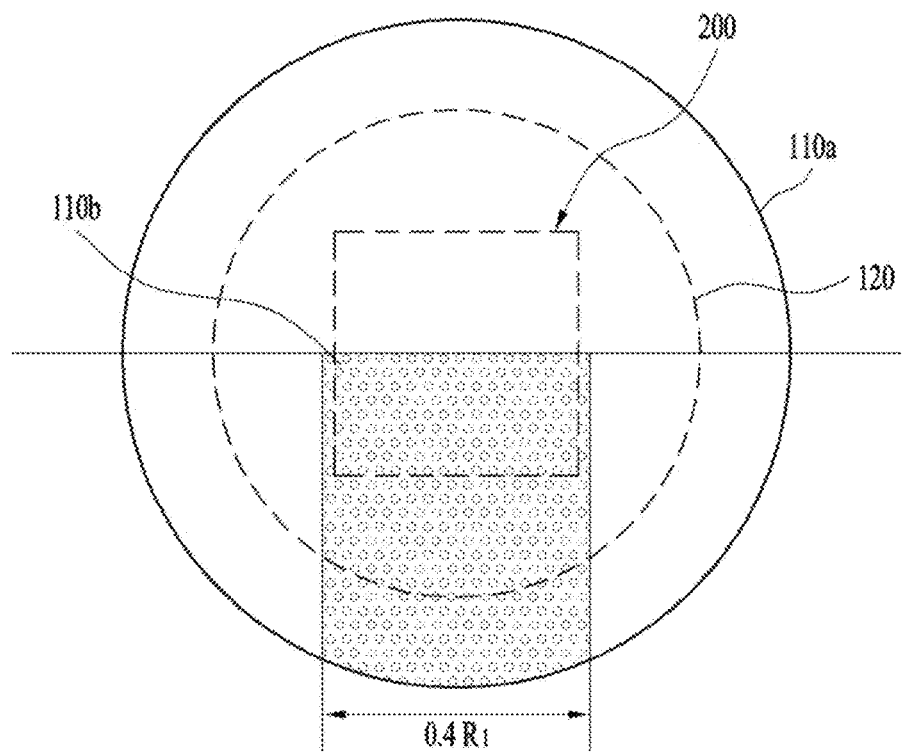

[FIG. 11h]
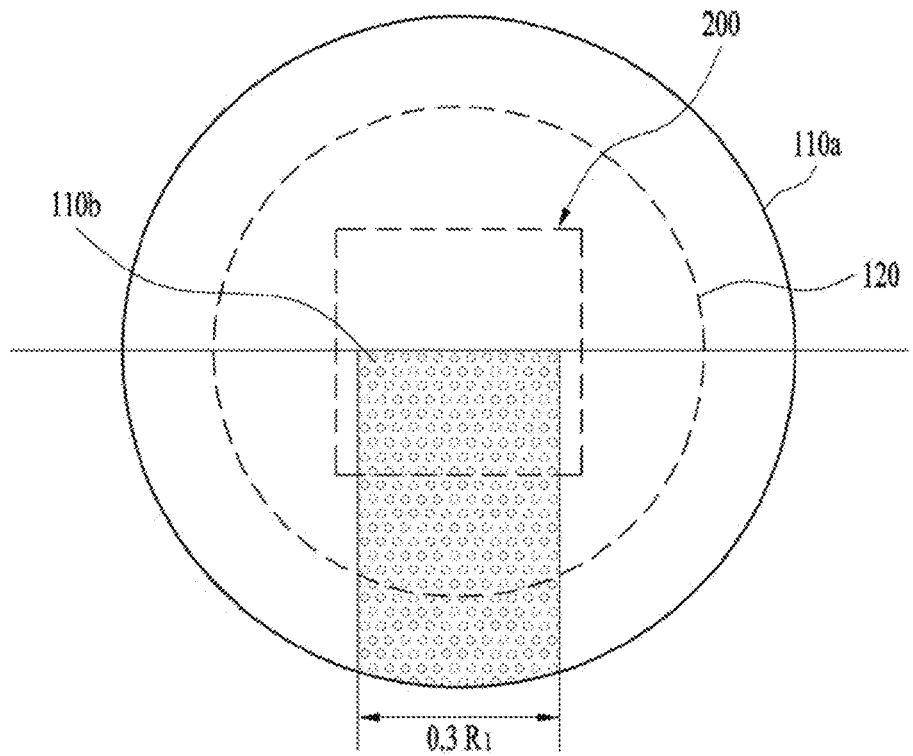
[FIG. 11i]
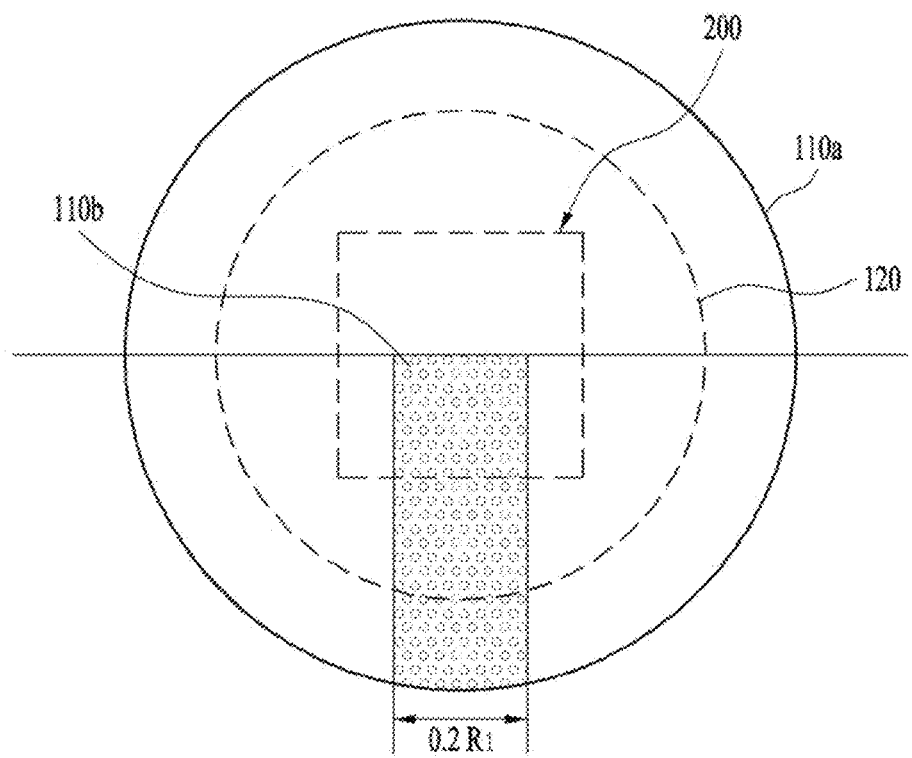

[FIG. 11j]
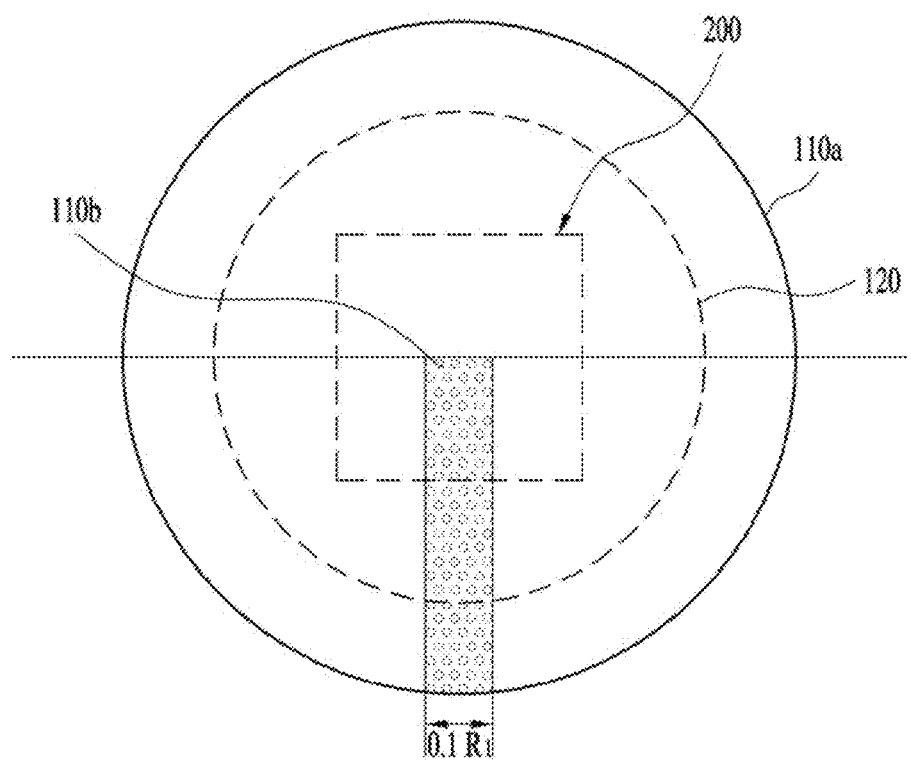
[FIG. 12a]
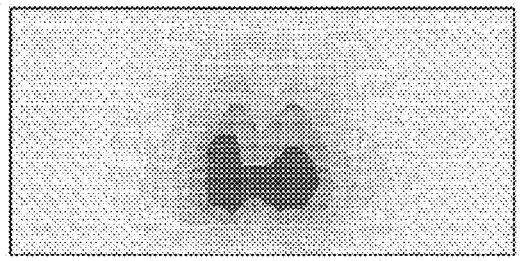 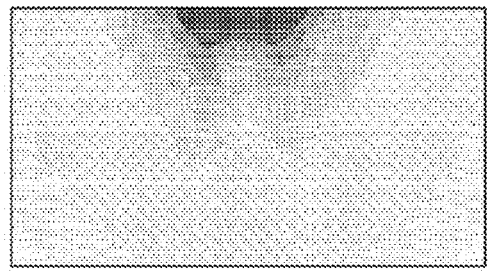
[FIG. 12b]
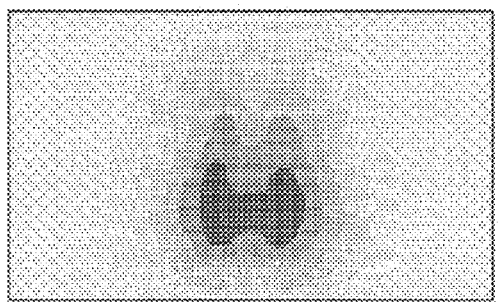 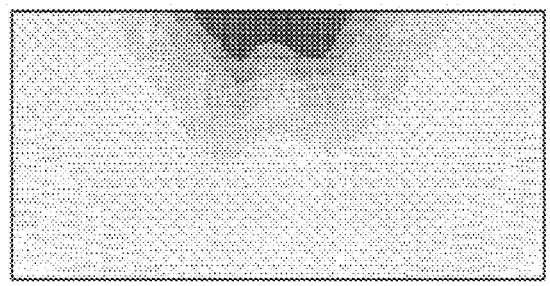

[FIG. 12c]
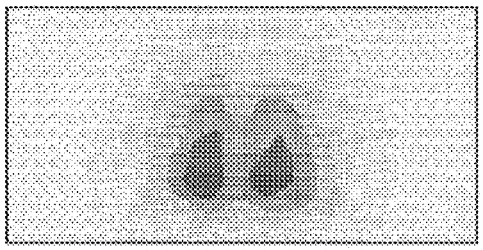
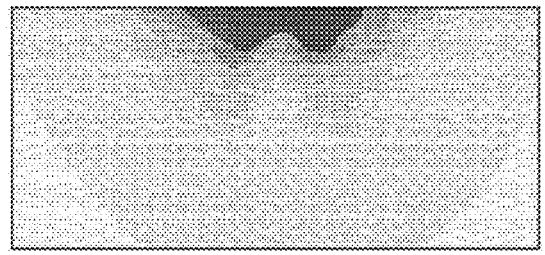
[FIG. 12d]
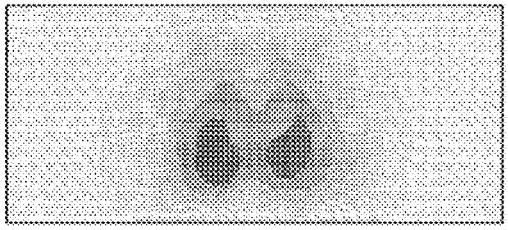
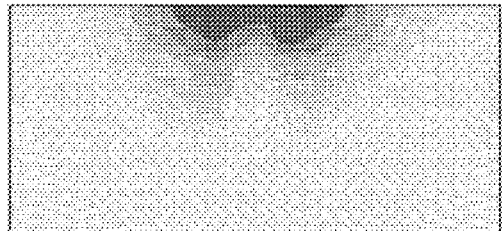
[FIG. 12e]
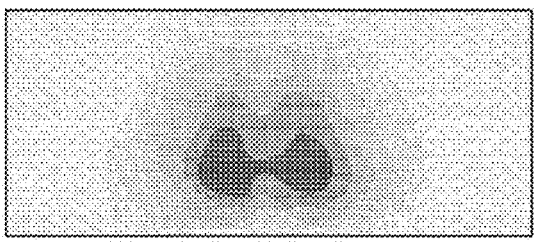
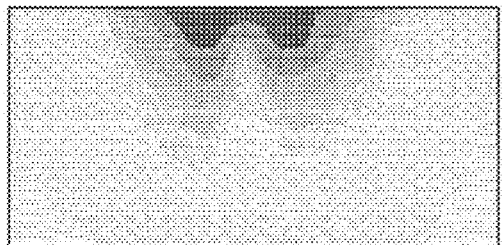
[FIG. 12f]
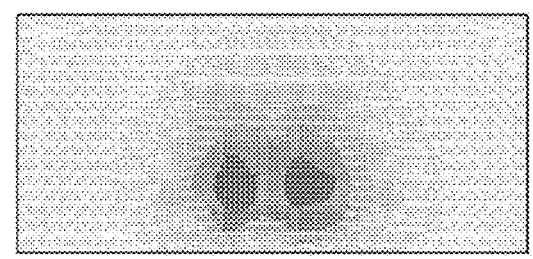
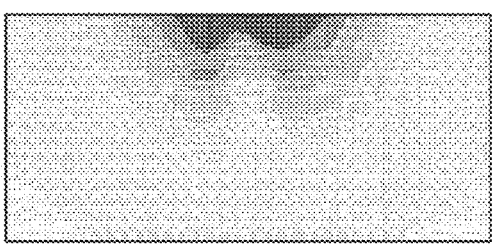

[FIG. 12g]
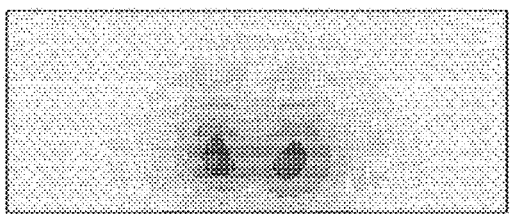
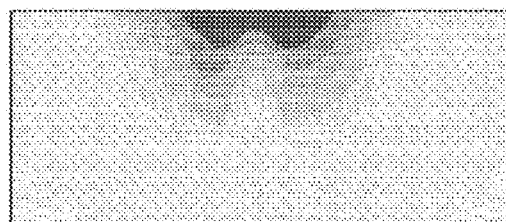
[FIG. 12h]
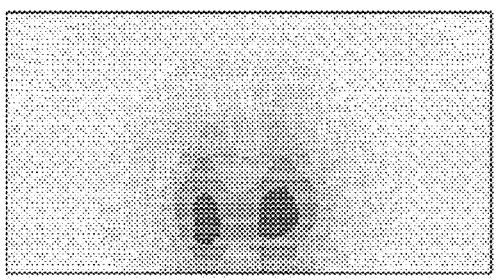
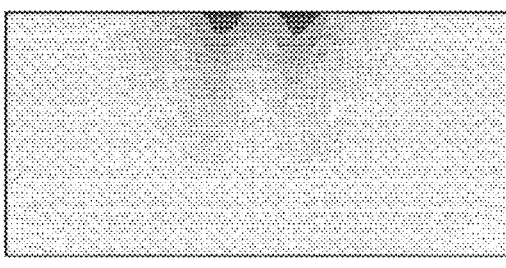
[FIG. 12i]
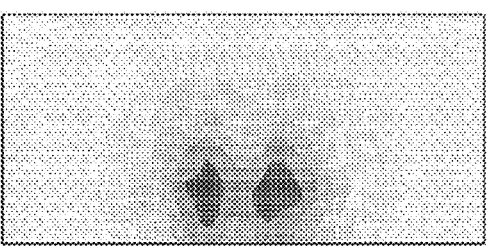
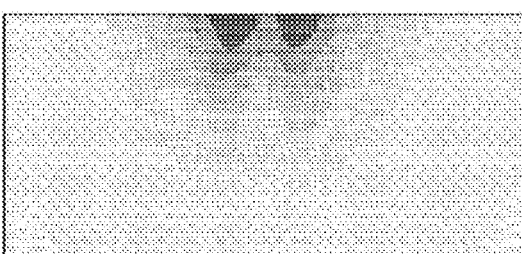
[FIG. 12j]
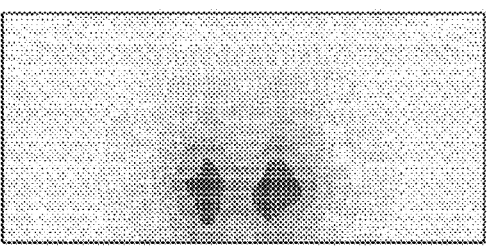
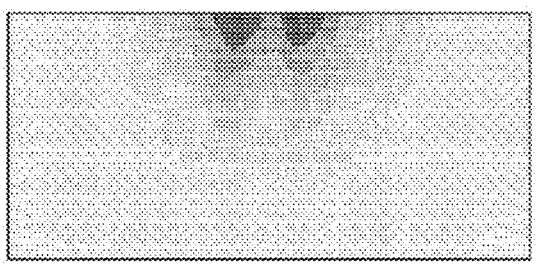

[FIG. 12k]
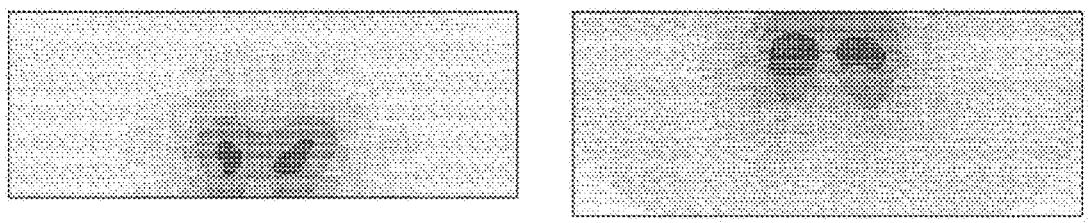
[FIG. 13a]
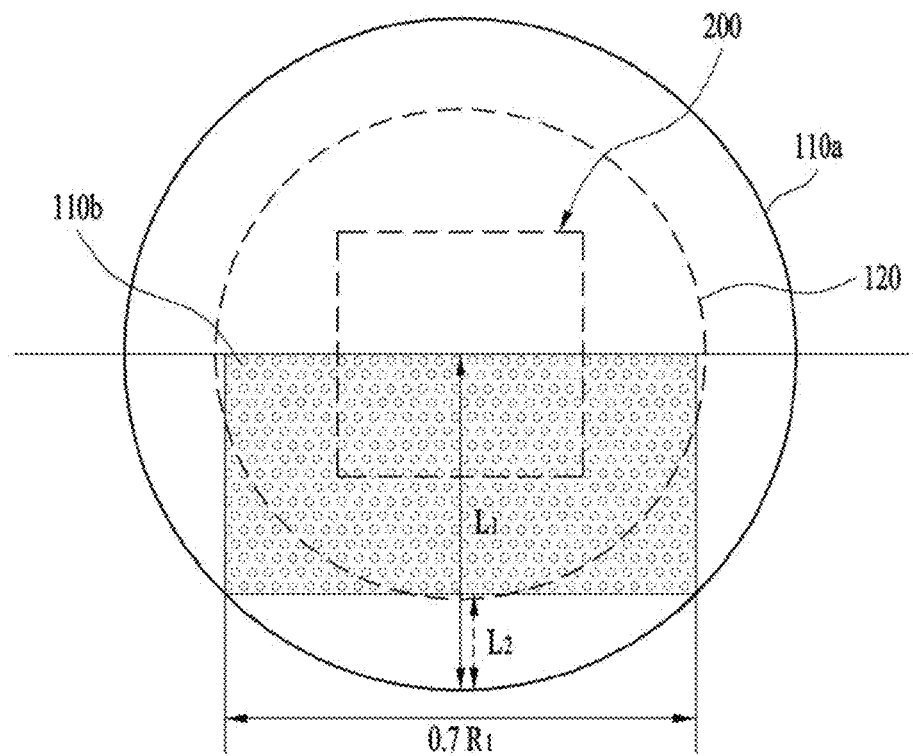

[FIG. 13b]
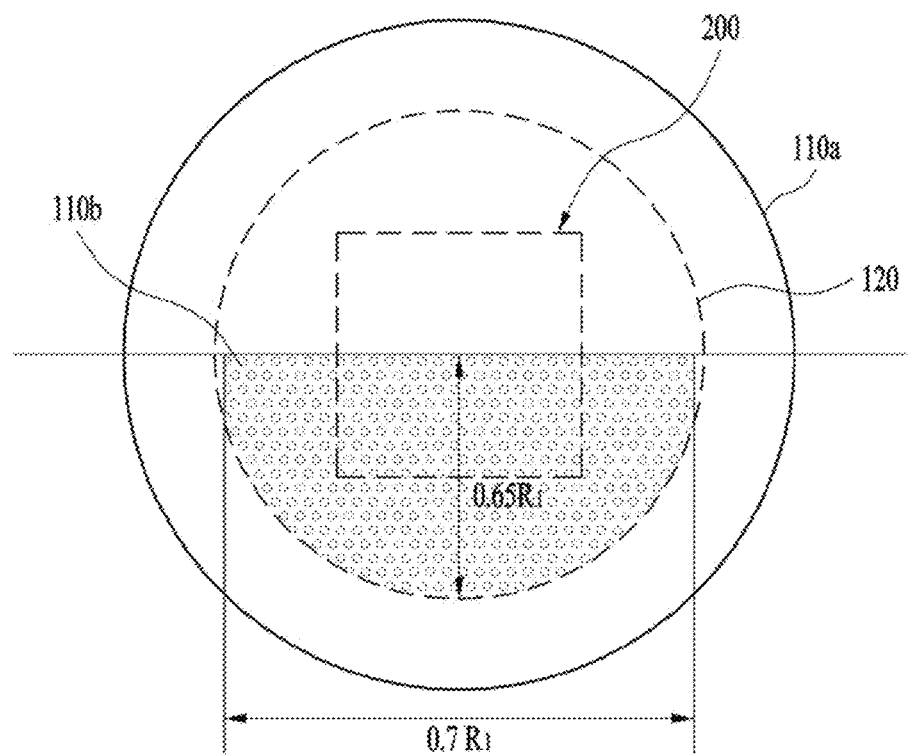
[FIG. 13c]
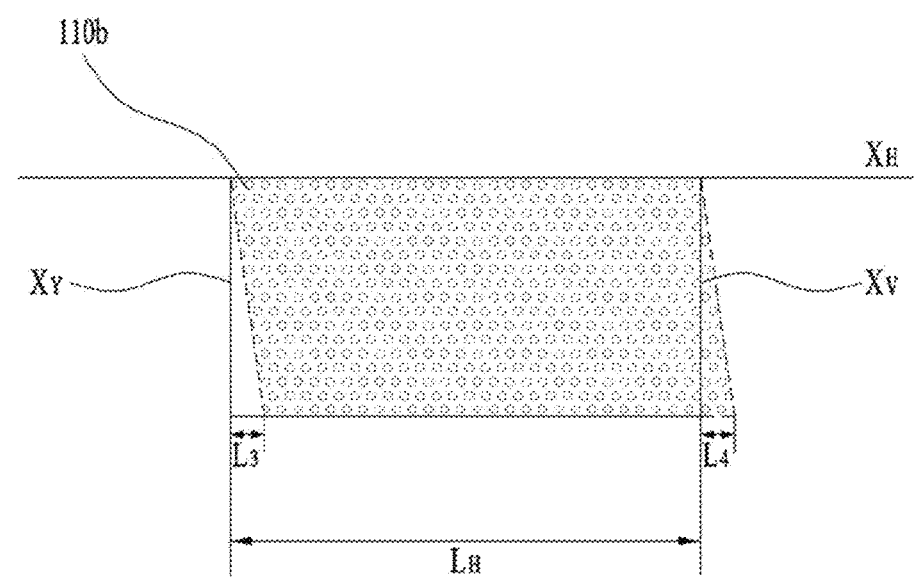

[FIG. 14]
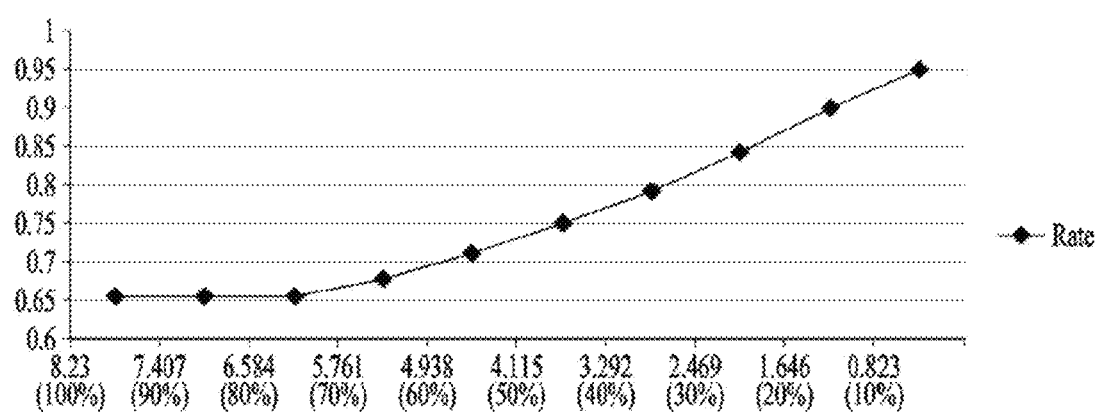

LENS AND LIGHT EMITTING UNIT INCLUDING SAME

CROSS REFERENCE TO RELATED APPLICATIONS

This application is the National Phase of PCT International Application No. PCT/KR2016/009295, filed on Aug. 23, 2016, which claims priority under 35 U.S.C. 119(a) to Patent Application Nos. 10-2015-0126789 and 10-2015-0126790, both filed in the Republic of Korea on Sep. 8, 2015, all of which are hereby expressly incorporated by reference into the present application.

TECHNICAL FIELD

Embodiments relate to a lens and a light emitting unit including the same, and more particularly, to a lens which concentrates light on a central region thereof, has excellent uniformity with peripheral regions and emits a large quantity of light in one direction, and a light emitting unit including the same.

BACKGROUND ART

Group III-V compound semiconductors, such as GaN, AlGaN, etc., have several advantages, namely, wide and easily adjustable bandgap energy, and are thus widely used in optoelectronics and for electronic elements.

Particularly, light emitting devices, such as light emitting diodes (LEDs) or laser diodes, which use group III-V or II-VI compound semiconductor materials, are capable of emitting visible light of various colors, such as red, green and blue, and ultraviolet light owing to development of element materials and thin film growth techniques, are also capable of emitting white light with high luminous efficacy through use of phosphors or by combining colors, and have several advantages, namely, low power consumption, semi-permanent lifespan, fast response speed, safety, and environmental friendliness, as compared to conventional light sources, such as fluorescent lamps and incandescent lamps.

Accordingly, application of the light emitting devices has been extended to transmission modules of optical communication means, light emitting diode backlights to replace Cold Cathode Fluorescent Lamps (CCFL) which serve as backlights of Liquid Crystal Display (LCD) apparatuses, white light emitting diode lighting apparatuses to replace fluorescent lamps or incandescent lamps, vehicle head lamps, and traffic lights.

A molding unit protecting a light emitting structure or wires may be arranged around a light emitting device and, when light passes through the molding unit formed of a material, such as silicone, the light is refracted by the molding unit and thus the molding unit may function as a primary lens.

However, when the light emitting device is used a light source of a lighting apparatus, a secondary lens may be used to adjust a light emission path and the secondary lens is generally referred to as a 'lens'.

A light path may be greatly changed according to materials of the lens, particularly, shapes of the lens, and, particularly, in an application, such as a streetlamp which causes light emitted by a light source to proceed only in a specific direction, i.e., a forward or backward direction, the shape of the lens is more important.

A lighting apparatus used as a streetlamp must concentrate light on a street side rather than a house side and a security light used as a lighting apparatus in a designated space must have excellent luminance in a central region thereof, but these lighting apparatuses must have a designated level of uniformity in edge regions thereof.

DISCLOSURE

Technical Problem

Embodiments provide a light emitting unit using a light source module including a light emitting device, which improves luminance in a central region thereof and optical uniformity in all areas within a designated space.

Further, embodiments provide a lens which concentrates light emitted to the outside in one direction in a lighting apparatus having a light source including a light emitting device, and a light emitting unit including the same.

Technical Solution

In one embodiment, a lens includes a lens body and a cavity disposed in the lens body, wherein an outer surface of the lens body includes a first side surface sloping toward a central axis at an acute angle with respect to a bottom surface of the lens body, an upper surface including a flat area, and an inflection part disposed between the side surface and the upper surface.

The inflection part may have a curved cross-section.

The cavity may include a second side surface sloping toward the central axis at an acute angle with respect to the bottom surface.

The second side surface may form a curved surface toward the central axis.

The second side may converge in an upper region of the cavity, and the curved surface with curvature may have a discontinuous point in a convergence region of the second side surface.

An angle formed by the second side surface in the direction of the central axis with respect to the bottom surface may be smaller than an angle formed by the first side surface in the direction of the central axis with respect to the bottom surface.

A region of the bottom surface of the lens body corresponding to a bottom surface of the cavity may be open.

A height from the bottom surface of the lens body to the upper surface of the lens body may be 1.8 to 2.2 times a height from the bottom surface of the lens body to a highest point of the cavity.

A line connecting a central point of a light emitting surface of a light source arranged in the cavity to the inflection part may be inclined at an angle of 33 degrees to 38 degrees with respect to the central axis.

A maximum diameter of the outer surface of the lens body may be 1.25 times to 1.75 times a maximum diameter of the cavity.

In another embodiment, a light emitting unit includes the above-described lens, and a light source module arranged in the lens, wherein the light source module includes a circuit board and a light emitting device, and a light emitting surface of the light emitting device is placed within the cavity.

When light emitted by the light source module is incident on the upper surface, an angle formed by the light emitted by the light source module with respect to the central axis may be smaller than an angle formed by light emitted to the outside through the outer surface of the lens with respect to the central axis.

When light emitted by the light source module is incident on the side surface, an angle formed by the light emitted by the light source module with respect to the central axis may be greater than an angle formed by light emitted to the outside through the outer surface of the lens with respect to the central axis.

Widths of the light emitting surface of the light emitting device may be 40% to 60% of a maximum diameter of the cavity.

A height from the bottom surface to the light emitting surface of the light emitting device may be 32% to 48% of a height of the cavity.

In accordance with another embodiment, a lens includes a lens body and a cavity disposed in the lens body, wherein an outer surface of the lens body includes a reflection region and a transmission region, and a pattern is arranged in the reflection region.

The reflection region and the transmission region may be symmetrical to each other about a vertical direction of the lens body.

The pattern may be carved in relief or in intaglio on the outer surface of the lens body.

When a diameter of the outer surface of the lens body is defined as $R_1$, a horizontal length of a cross-section of a portion, provided with the pattern, of the reflection region may be $0.7R_1$ or more.

The outer surface of the lens body may further include a first side surface sloping toward a central axis at an acute angle with respect to a bottom surface of the lens body, an upper surface including a flat area, and an inflection part disposed between the side surface and the upper surface.

The inflection part may have a curved cross-section.

The cavity may include a second side surface sloping toward the central axis at an acute angle with respect to the bottom surface.

The second side surface may form a curved surface toward the central axis.

The second side may converge in an upper region of the cavity, and the curved surface with curvature may have a discontinuous point in a convergence region of the second side surface.

An angle formed by the second side surface in the direction of the central axis with respect to the bottom surface may be smaller than an angle formed by the first side surface in the direction of the central axis with respect to the bottom surface.

A region of the bottom surface of the lens body corresponding to a bottom surface of the cavity may be open.

A line connecting a central point of a light emitting surface of a light source arranged in the cavity to the inflection part may be inclined at an angle of 33 degrees to 38 degrees with respect to the central axis.

In accordance with yet another embodiment, a light emitting unit includes the above-described lens, and a light source module arranged in the lens, wherein the light source module includes a circuit board and a light emitting device, and a light emitting surface of the light emitting device is placed within the cavity.

Advantageous Effects

In a lens and a light emitting unit including the same in accordance with one embodiment, light emitted by a light source module passes through a first region of the lens and may thus proceed to a central region, as compared to light passing through a second region of the lens. Thus, light passing through the central region of the lens may proceed at a larger angle, and light passing through the edge region of the lens may proceed at a smaller angle.

Therefore, uniformity of light in an area of the outside of the lens corresponding to the central region of the lens may be improved, and light may be concentrated on an area within a designated range outside the lens.

Further, if the lens or the light emitting unit is arranged such that a reflection region thereof faces a house side and a transmission region thereof faces a street side, light is transmitted only to the street side and light transmitted to the house side may be blocked or a quantity thereof may be reduced, due to action of a pattern arranged in the reflection region of the lens and, thus, the lens or the light emitting unit may be used as a streetlamp.

Further, if the lens or the light emitting unit having the above-described structure is used as a security light, the lens or the light emitting unit may concentrate light on some areas of a specific region.

DESCRIPTION OF DRAWINGS

FIG. 1a is a perspective view of a lens in accordance with one embodiment.

FIG. 1b is a perspective view of a light emitting unit including the lens of FIG. 1a.

FIGS. 2a and 2b are cross-sectional views of the lens of FIG. 1a.

FIG. 3 is a top view of the light emitting unit of FIG. 2b.

FIG. 4a is a view of a light source module in accordance with one embodiment, arranged in the light emitting unit.

FIG. 4b is a view illustrating a light emitting device of FIG. 4a in accordance with one embodiment.

FIG. 5a is a view illustrating a path of light emitted by the light source module and discharged to the outside via a first region of the lens.

FIG. 5b is a view illustrating a path of light emitted by the light source module and discharged to the outside via a second region of the lens.

FIG. 6 is a view illustrating changes in the light paths at both sides of an inflection part.

FIGS. 7a and 7b are graphs representing change in ratios of incidence angles to exit angles of light, when a size of the lens is varied.

FIG. 8a is a perspective view of a lens in accordance with a second embodiment.

FIG. 8b is a perspective view of a light emitting unit including the lens of FIG. 8a.

FIGS. 9a and 9b are cross-sectional views of the lens of FIG. 8a.

FIG. 10 is a top view of the light emitting unit of FIG. 9b.

FIGS. 11a to 11j are views illustrating change in a portion provided with a pattern in a reflection region of the outer surface of the lens.

FIGS. 12a to 12j are views illustrating light distributions in upper and lower regions of FIGS. 11a to 11j.

FIG. 12k is a view illustrating light distributions if no pattern is formed on the outer surface of the lens.

FIGS. 13a to 13c are views illustrating pattern distribution ranges in the reflection region of the outer surface of the lens.

FIG. 14 is a graph representing Table 2.

BEST MODE

Hereinafter, embodiments will be described with reference to the annexed drawings.

In the following description of the embodiments, it will be understood that, when each element is referred to as being formed "on" or "under" another element, it can be directly "on" or "under" the other element or be indirectly formed with one or more intervening elements therebetween. Further, when an element is referred to as being formed "on" or "under" another element, not only the upward direction of the former element but also the downward direction of the former element may be included.

In addition, it will be understood that, although the relational terms "first", "second", "on/above/upper", "under/below/lower", etc. may be used herein to describe various elements, these terms neither require nor connote any physical or logical relations between substances or elements or the order thereof, and are used only to discriminate one substance or element from other substances or elements.

Hereinafter, a lens and a light emitting unit in accordance with one embodiment will be described with reference to the accompanying drawings.

FIG. 1a is a perspective view of a lens in accordance with one embodiment, and FIG. 1b is a perspective view of a light emitting unit including the lens of FIG. 1a.

A lens 100a in accordance with this embodiment includes a lens body, the lens body may be formed of polycarbonate, etc. and include an outer surface 110 exposed to the outside and an inner surface 120 forming a side wall of a cavity formed in the lens body, and the outer surface 110 and the inner surface 120 may be connected at a bottom surface 130 of the lens body.

Further, a light emitting device module 200 is arranged in the cavity, and the light emitting device module 200 will be described later with reference to FIGS. 4a and 4b.

FIGS. 2a and 2b are cross-sectional views of the lens of FIG. 1a.

The lens body and the light source module 200 may be arranged so as to be bilaterally symmetrical about a central axis Xcenter. In more detail, the outer surface of the lens body may include a first side surface 111 sloping toward the central axis Xcenter at an acute angle $\theta_1$ with respect to the bottom surface 130, an upper surface 112 including a flat area, and a deflection part 113 arranged between the side surface 111 and the upper surface 112.

Further, the bottom surface 130 and the upper surface 112 of the lens body may be arranged in parallel.

Here, the side surface 111 may slope with respect to the bottom surface 130 and have a curved cross-section, and the deflection part 113 may be an interface between the curved side surface 111 and the flat upper surface 112 and have a curved cross-section.

The cavity may include a second side surface 120 sloping toward the central axis Xcenter at an acute angle $\theta_2$ with respect to the bottom surface 130, and the second side surface 120 may be the inner surface of the lens body.

The second side surface 120 forming the side surface of the cavity may be arranged so as to form a curved surface and converge onto one point in an upper region of the cavity, and the 'curved surface' having curvature may have a discontinuous point $C_2$ in a convergence region of the second side surface 120.

The discontinuous point $C_2$ is arranged so as to correspond to a central point $C_1$ of the upper surface of the lens body and a central point $C_3$ of a light emitting surface of the light source module 200 in the vertical direction and, thus, a virtual line connecting the central points $C_1$ and $C_3$ and the discontinuous point $C_2$ may form the central axis Xcenter.

In FIG. 2b, the angle $\theta_2$ formed by the second side surface 120 with respect to the bottom surface 130 in the direction of the central axis Xcenter may be smaller than the angle $\theta_1$ formed by the first side surface 111 with respect to the bottom surface 130 in the direction of the central axis Xcenter, i.e., the first side surface 111 may be arranged so as to be steeper than the second side surface 120 with respect to the bottom surface 130 so that the side wall of the cavity may have a greater angle with respect to the bottom surface than the first side surface 111 of the lens body.

At least a part of the light source module 200 may be inserted into the cavity and, as exemplarily shown in FIG. 1b, the second side surface 120 may form the side wall of the cavity, the cavity may have an open bottom surface and the bottom surface of the cavity may be parallel to the bottom surface 130 of the lens body.

In FIG. 2a, a height $h_1$ from the bottom surface 130 of the lens body to the upper surface 112 of the lens body may be 1.8 to 2.2 times a height $h_2$ from the bottom surface 130 of the lens body to the highest point of the cavity, i.e., the discontinuous point $C_2$.

If a ratio of h1/h2 is less than 1.8, a space of the cavity into which the light source module 200 is inserted is excessively widened and thus optical loss may occur in the cavity, or a thickness from the second side surface 120 of the lens body to the upper surface 112 is excessively small and thus paths of light emitted by the light source module 200 may not be sufficiently changed and, even if an angle $\theta_i$, which will be described later, is 33 degrees to 38 degrees, a proceeding region of light emitted by the lens may be narrowed, and, if the ratio of h1/h2 exceeds 2.2, the space of the cavity into which the light source module 200 is inserted is excessively narrowed or a size of the lens in the vertical direction is excessively increased and thus paths of light emitted by the light source module 200 may extend and optical loss may occur.

Further, a height $h_3$ from the bottom surface 130 to the light emitting surface of the light emitting device may be 32% to 48% of the height $h_2$ of the cavity.

If a ratio of h3/h2 is less than 0.32, the space of the cavity into which the light source module 200 is inserted is excessively widened and thus optical loss may occur in the cavity, or a volume of the light source module 200 inserted into the cavity is excessively decreased and thus, among light emitted by the light source module 200, a quantity of light proceeding to the upper surface 112 of the lens may be decreased and a quantity of light proceeding to the first side surface 111 may be increased. Further, if the ratio of h3/h2 exceeds 0.48, the size of the lens in the vertical direction is excessively increased and thus paths of light emitted by the light source module 200 may extend and optical loss may occur.

For example, the height $h_1$ from the bottom surface 130 of the lens body to the upper surface 112 of the lens body may be 5 mm, the height $h_2$ from the bottom surface 130 of the lens body to the discontinuous point $C_2$ of the cavity may be 2.50 mm, and the height $h_3$ from the bottom surface 130 of the lens body to the light emitting surface of the light source module 200 may be 1 mm.

A point, at which a line Xi connecting the central point $C_3$ of the light emitting surface of the light source module arranged in the cavity to the inflection part meets the inflection part, may be defined as 'i' and, in this case, an angle $\theta_i$ formed between the central axis Xcenter and the above-described line Xi may be 33 to 38 degrees, for example, be 35 degrees.

FIG. 3 is a top view of the light emitting unit of FIG. 2b and, for convenience of understanding, the inner surface 120 of the lens body and the light source module 200 are shown by dotted lines.

A maximum diameter $R_1$ of the outer surface of the lens may be greater than a maximum diameter $R_2$ of the inner surface of the lens corresponding to a maximum diameter of the cavity, for example, be 1.25 to 1.75 times the maximum diameter $R_2$. Further, a length $W_{31}$ of the light source module 200 in a first direction and a length $W_{32}$ of the light source module 200 in a second direction may be equal to each other and be smaller than the maximum diameter $R_2$ of the inner surface of the lens.

Further, the widths $W_{31}$ and $W_{32}$ of the light emitting surface of the light emitting device corresponding to the surface of the light source module may be 40% to 60% of the maximum diameter $R_2$ of the cavity and, for example, the widths $W_{31}$ and $W_{32}$ of the light emitting surface of the light emitting device may be 3 mm.

FIG. 4a is a view of the light source module in accordance with one embodiment, arranged in the light emitting unit and FIG. 4b is a view illustrating a light emitting device of FIG. 4a in accordance with one embodiment.

The light source module 200 may include a circuit board and a light emitting device. The circuit board may employ a printed circuit board or a flexible circuit board.

The light emitting device may be a light emitting diode, for example, a vertical light emitting device, a horizontal light emitting device or a flip chip-type light emitting deice, and FIG. 4b exemplarily illustrates a vertical light emitting device.

In a light emitting device 210, a bonding layer 214, a reflective layer 213 and an ohmic layer 212 may be arranged on a support substrate 215, a light emitting structure 211 may be arranged on the ohmic layer 212, and a channel layer 219 may be arranged at the edge of a lower surface of the light emitting structure.

The support substrate 215 is a base substrate formed of at least one of copper (Cu), gold (Au), nickel (Ni), molybdenum (Mo) or copper-tungsten (Cu-W). Further, the support substrate 215 may be a carrier wafer formed of, for example, Si, Ge, GaAs, ZnO, SiC, SiGe, $Ga_2O_3$ or GaN.

The bonding layer 350 may be arranged on the support substrate 215. The bonding layer 214 may bond the reflective layer 213 to the support substrate 215. The bonding layer 214 may include, for example, at least one of Ti, Au, Sn, Ni, Cr, Ga, In, Bi, Cu, Ag or Ta.

The reflective layer 213 may be formed on the bonding layer 214. The reflective layer 213 may be formed of a material having excellent reflection characteristics, for example, one selected from the group consisting of silver (Ag), nickel (Ni), aluminum (Al), rubidium (Rh), palladium (Pd), iridium (Ir), ruthenium (Ru), magnesium (Mg), zinc (Zn), platinum (Pt), gold (Au), hafnium (Hf) and selective combinations thereof, or be formed to have a monolayer structure or a multilayer structure using the above metals and light transmitting conductive materials, such as IZO, IZTO, IAZO, IGZO, IGTO, AZO and ATO. Further, the reflective layer 213 may be formed to have a stacked structure, such as IZO/Ni, AZO/Ag, IZO/Ag/Ni or AZO/Ag/Ni, but the disclosure is not limited thereto.

The ohmic layer 212 may be formed on the reflective layer 213 and, in this case, the ohmic layer 212 may be in ohmic contact with the lower surface of the light emitting structure and be formed as a layer or a plurality of patterns.

The ohmic layer 212 may be formed selectively using a light transmitting electrode layer and a metal. For example, the ohmic layer 212 may be formed to have a monolayer structure or a multilayer structure using one or more selected from the group consisting of indium tin oxide (ITO), indium zinc oxide (IZO), indium zinc tin oxide (IZTO), indium aluminum zinc oxide (IAZO), indium gallium zinc oxide (IGZO), indium gallium tin oxide (IGTO), aluminum zinc oxide (AZO), antimony tin oxide (ATO), gallium zinc oxide (GZO), IrOx, RuOx, RuOx/ITO, Ni, Ag, Ni/IrOx/Au and Ni/IrOx/Au/ITO.

The support substrate 215, the bonding layer 214, the reflective layer 213 and the ohmic layer 212 may function as a second electrode and supply current to the light emitting structure.

The channel layer 219 may be arranged between the second electrode and the edge of the light emitting structure. The channel layer 219 may be arranged at the edge of the lower surface of the light emitting structure and be formed of a light transmitting material, for example, a metal oxide, a metal nitride, a light transmitting nitride, a light transmitting oxide or a light transmitting insulating layer.

For example, the channel layer 219 may be formed selectively using indium tin oxide (ITO), indium zinc oxide (IZO), IZO nitride (IZON), indium zinc tin oxide (IZTO), indium aluminum zinc oxide (IAZO), indium gallium zinc oxide (IGZO), indium gallium tin oxide (IGTO), aluminum zinc oxide (AZO), antimony tin oxide (ATO), gallium zinc oxide (GZO), $SiO_2$, $SiO_x$, $SiO_xN_y$, $Si_3N_4$, $Al_2O_3$, $TiO_2$, etc.

The light emitting structure 211 may be arranged on the ohmic layer 212. The light emitting structure 211 may include a first conductivity-type semiconductor layer 211a, an active layer 211b and a second conductivity-type semiconductor layer 211c.

The first conductivity-type semiconductor layer 211a may be formed of a compound semiconductor, i.e., a group III-V or group II-VI compound semiconductor, and be doped with a first conductivity-type dopant. For example, the first conductivity-type semiconductor layer 211a may be formed of a semiconductor material having an empirical formula of $Al_xIn_yGa_{1-x-y}N$ ($0 \leq x \leq 1$, $0 \leq y \leq 1$, $0 \leq x+y \leq 1$), i.e., one or more selected from the group consisting of AlGaN, GaN, InAlGaN, AlGaAs, GaP, GaAs, GaAsP and AlGaInP.

If the first conductivity-type semiconductor layer 211a is an n-type semiconductor layer, the first conductivity-type dopant may be an n-type dopant, such as Si, Ge, Sn, Se or Te. The first conductivity-type semiconductor layer 211a may be formed to have a monolayer structure or a multilayer structure, but the disclosure is not limited thereto.

The active layer 211b may be arranged between the first conductivity-type semiconductor layer 211a and the second conductivity-type semiconductor layer 211c, and include one of a double hetero structure, a multi-well structure, a single quantum well structure, a multi-quantum well (MQW) structure, a quantum wire structure and a quantum dot structure.

The active layer 211b may be formed of a group III-V compound semiconductor, have an empirical formula of $In_xAl_yGa_{1-x-y}N$ ($0 \leq x \leq 1$, $0 \leq y \leq 1$, $0 \leq x+y \leq 1$) and be formed to have one or more paired structures of well and barrier layers, for example, selected from the group consisting of AlGaN/AlGaN, InGaN/GaN, InGaN/InGaN, AlGaN/GaN, InAlGaN/GaN, GaAs(InGaAs)/AlGaAs and GaP(InGaP)/AlGaP, but the disclosure is not limited thereto.

The well layer may be formed of a material having a lower energy bandgap than the energy bandgap of the barrier layer.

The second conductivity-type semiconductor layer 211c may be formed of a compound semiconductor. The second conductivity-type semiconductor layer 211c may be formed of a group III-V or group II-VI compound semiconductor, and be doped with a second conductivity-type dopant. For example, the second conductivity-type semiconductor layer 211c may be formed of a semiconductor material having an empirical formula of $In_xAl_yGa_{1-x-y}N$ ($0 \le x \le 1$, $0 \le y \le 1$, $0 \le x+y \le 1$), i.e., one or more selected from the group consisting of AlGaN, GaNAlInN, AlGaAs, GaP, GaAs, GaAsP and AlGaInP.

If the second conductivity-type semiconductor layer 211c is a p-type semiconductor layer, the second conductivity-type dopant may be a p-type dopant, such as Mg, Zn, Ca, Sr or Ba. The second conductivity-type semiconductor layer 211c may be formed to have a monolayer structure or a multilayer structure, but the disclosure is not limited thereto.

Although not shown in the drawings, an electron blocking layer may be arranged between the active layer 211b and the second conductivity-type semiconductor layer 211c. The electron blocking layer may have a superlattice structure, and, for example, in the superlattice structure, an AlGaN layer doped with a second conductivity-type dopant may be arranged and a plurality of GaN layers having different ratios of aluminum may be alternately arranged, but the disclosure is not limited thereto.

A pattern, such as prominences and depressions, may be formed on the surface of the first conductivity-type semiconductor layer 211a and may thus improve light extraction efficiency, a first electrode 216 may be arranged on the surface of the first conductivity-type semiconductor layer 211a, and the pattern may be formed on the surface of the first conductivity-type semiconductor layer 211a, on which the first electrode 216 is arranged, as exemplarily shown in these figures, or no pattern may be formed thereon. The first electrode 216 may be formed to have a monolayer structure or a multilayer structure including at least one of aluminum (Al), titanium (Ti), chrome (Cr), nickel (Ni), copper (Cu) or gold (Au).

A current blocking layer 218 corresponding to the first electrode 216 may be arranged under the light emitting structure 211, and the current blocking layer may be formed of an insulating material and uniformly supply current, supplied from a direction of the support substrate 215, throughout the entirety of the second conductivity-type semiconductor layer 211c. The current blocking layer 218 may be arranged in a region vertically overlapping the first electrode 216, but the disclosure is not limited thereto.

A passivation layer 217 may be formed around the light emitting structure 211. The passivation layer 217 may be formed of an insulating material, and the insulating material may include a nonconductive oxide or nitride. For example, the passivation layer 217 may include at least one of a silicon oxide ($SiO_2$) layer, an oxynitride layer or an aluminum oxide layer.

The light source module 200 is inserted into the cavity of the above-described lens and may thus form a light emitting unit. Here, the entirety or a part of the light source module 200 may be inserted into the cavity and, particularly, the light emitting surface of the light emitting device may be placed within the cavity.

FIG. 5a is a view illustrating a path of light emitted by the light source module and discharged to the outside via a first region of the lens, and FIG. 5b is a view illustrating a path of light emitted by the light source module and discharged to the outside via a second region of the lens.

In FIG. 2b, a region proceeding from the point i, at which the line Xi connecting the central point $C_3$ of the light emitting surface to the inflection part meets the inflection part, in a direction toward the central axis Xcenter may be defined as a first region of the lens or the lens body, and a region proceeding from the point i in the opposite direction may be defined as a second region of the lens or the lens body.

As exemplarily shown in FIG. 5a, when light emitted by the light source module 200 passes through the first region of the lens 100a and is incident upon the upper surface of the outer surface 110, an angle $\theta_{31}$ formed by the light emitted by the light source module 200 with respect to the central axis Xcenter may be smaller than an angle $\theta_{41}$ formed by light emitted to the outside through the outer surface 110 of the lens 100a with respect to the central axis Xcenter.

Further, as exemplarily shown in FIG. 5b, when light emitted by the light source module 200 passes through the second region of the lens 100a and is incident upon the side surface of the outer surface 110, an angle $\theta_{32}$ formed by the light emitted by the light source module 200 with respect to the central axis Xcenter may be greater than an angle $\theta_{42}$ formed by light emitted to the outside through the outer surface 110 of the lens 100a with respect to the central axis Xcenter.

FIG. 6 is a view illustrating changes in the light paths at both sides of the inflection part. A tangential direction and a normal direction at the interface between the lens body and air are shown by alternating long and short dash lines.

According to Snell's law, when light passes through two media having different refractive indexes, an angle of light in one media having a greater refractive index with respect to a normal of the interface of the two media is greater than an angle of light in the other media.

A refractive index of the lens body formed of polycarbonate (PC) is about 1.58 to 1.60 and is thus greater than a refractive index of air and, therefore, as exemplarily shown in FIG. 6, light L1 inside the inflection part proceeding to air is refracted in an edge direction, as compared to a light path within the lens body, and light L2 outside the inflection part proceeding to air is reflected in a central direction, as compared to a light path within the lens body.

Light emitted by the light source module shown in FIG. 5a passes through the first region of the lens and may thus proceed to a central region, as compared to light passing through the second region of the lens, shown in FIG. 5b. Therefore, light passing through the central region of the lens may proceed at a larger angle, and light passing through the edge region of the lens may proceed at a smaller angle. Therefore, uniformity of light in an area of the outside corresponding to the central region of the lens may be improved, and light may be concentrated on an area within a designated range outside the lens.

FIGS. 7a and 7b are graphs representing change in ratios of the above-described angles $\theta_{41}/\theta_{31}$ and $\theta_{42}/\theta_{32}$, when a size of the lens is varied, the vertical axis represents the ratio of the above-described angles $\theta_{41}/\theta_{31}$ or $\theta_{42}/\theta_{32}$, and the horizontal axis represents the angle $\theta_i$ formed between the central axis Xcenter and the line Xi.

In the graph of FIG. 7a, if the height of the light source module is 1 and the lengths of the light emitting surface in the horizontal and vertical directions are equal, the height of the outer surface of the lens is 5 times the height of the light source module, the height of the inner surface of the lens is 2.5 times the height of the light source module, and the diameter of the outer surface of the lens is 1.6 times the diameter of the inner surface of the lens.

In the graph of FIG. 7b, the same conditions as in FIG. 7a are applied except that the diameter of the outer surface of the lens is 80% the diameter of the outer surface of the lens of FIG. 7a.

It may be understood from FIGS. 7a and 7b that, when light emitted by the light source module passes through a region within a range of an angle of about 35 degrees or less from the central axis, i.e., the first region of the lens, light emitted through the outer surface of the lens may proceed at a greater angle than an angle of light emitted by the light source module angle. Further, it may be understood that, when light emitted by the light source module passes through a region within a range of an angle of about 35 degrees or more from the central axis, i.e., the second region of the lens, light emitted through the outer surface of the lens may proceed at a smaller angle than an angle of light emitted by the light source module.

The above-described lens may have average illuminance of 4 lux or more in the outer area and luminance uniformity of 0.5 or more.

Here, the average illuminance may be measured in an area having a horizontal length of 8 m and a vertical length of 4 m if the lens is arranged at a height of 4 m from the bottom surface, in an area having a horizontal length of 12 m and a vertical length of 6 m if the lens is arranged at a height of 5 m from the bottom surface, and in an area having a horizontal length of 16 m and a vertical length of 8 m if the lens is arranged at a height of 6 m from the bottom surface.

Further, luminance uniformity is a value acquired by dividing a minimum luminance value measured in the above-described area by a maximum luminance value.

Table 1 represents luminous efficacy, average illuminance and luminance uniformity, when the angle formed by the inflection part with respect to the central axis of the lens is varied.

TABLE 1

| Angle ($\theta_i$) | Luminous efficacy | Average illuminance | Luminance uniformity | Remark |
|---|---|---|---|---|
| 35.97 | 0.532 | 4.399 | 0.542 | FIG. 7a |
| 35.97 | 0.670 | 5.512 | 0.543 | FIG. 7b |
| 32.13 | 0.582 | 4.855 | 0.493 | |
| 33.11 | 0.566 | 4.723 | 0.506 | |
| 37.77 | 0.494 | 4.130 | 0.590 | |
| 38.69 | 0.488 | 3.984 | 0.602 | |

It may be understood from Table 1 in that the lens in accordance with the embodiment shown in FIGS. 6a and 6b has average illuminance which is greater than 4.0 and luminance uniformity which is 0.5 or more.

It may be understood that, if the above-described angle $\theta_i$ is less than 33 degrees, luminance uniformity is decreased to 0.5 or less and, if the angle $\theta_i$ is greater than 38 degrees, average illuminance is decreased to 4.0 or less.

When the light emitting unit including the above-described lens is used as a lighting apparatus, for example, a security light illuminating a designated area, the lens maintains average illuminance of 4.0 or less and luminance uniformity of 0.5 or more and may thus uniformly illuminate the designated area with a designated brightness or more. FIG. 8a is a perspective view of a lens in accordance with a first embodiment, as seen from the top, and FIG. 8b is a perspective view of a light emitting unit including the lens of FIG. 8a, as seen from the bottom.

A lens 110b in accordance with this embodiment may include a lens body, the lens body may include an outer surface exposed to the outside and an inner surface 120 forming a side wall of a cavity formed in the lens body, and the outer surface and the inner surface 120 may be connected at a bottom surface 130 of the lens body.

Further, the outer surface of the lens body may include a transmission region 110a and a reflection region 110b, and the transmission region 110a and the reflection region 110b may be symmetrical to each other about the vertical direction of the lens body without being limited thereto.

A pattern, which is carved in relief or in intaglio on the outer surface, may be formed in the reflection region 110b, and the pattern in relief or in intaglio may be nonuniform and have a smaller size than a diameter $R_1$ of the outer surface of the lens 110b. The pattern may be formed by etching or sanding the outer surface during a process of manufacturing the lens 110b.

Further, a light emitting device module 200 is arranged in the cavity, and the light emitting device module 200 in accordance with this embodiment may be the same as that in accordance with the above-described embodiment.

FIGS. 9a and 9b are cross-sectional views of the lens of FIG. 8a.

The outer surface of the lens body may include a first side surface 111 sloping toward a central axis Xcenter at an acute angle $\theta_1$ with respect to the bottom surface 130, an upper surface 112 including a flat area, and a deflection part 113 arranged between the side surface 111 and the upper surface 112.

Here, the side surface 111 may slope with respect to the bottom surface 130 and have a curved cross-section, and the deflection part 113 may be an interface between the curved side surface 111 and the flat upper surface 112 and have a curved cross-section.

The cavity may include a second side surface 120 sloping toward the central axis Xcenter at an acute angle $\theta_2$ with respect to the bottom surface 130, and the second side surface 120 may be the inner surface of the lens body.

The second side surface 120 forming the side surface of the cavity may be arranged so as to form a curved surface and converge onto one point in an upper region of the cavity, and the 'curved surface' having curvature may have a discontinuous point $C_2$ in a convergence region of the second side surface 120.

The discontinuous point $C_2$ is arranged so as to correspond to a central point $C_1$ of the upper surface of the lens body and a central point $C_3$ of a light emitting surface of the light source module 200 in the vertical direction and, thus, a virtual line connecting the central points $C_1$ and $C_3$ and the discontinuous point $C_2$ may form the central axis Xcenter.

The 'central axis' may be arranged in the vertical direction of the lens 110b and, in FIGS. 9a and 9b, a left side of the lens based on the central axis may be the reflection region 110b and a right side of the lens based on the central axis may be the transmission region 110a.

In FIG. 9b, an angle $\theta_2$ formed by the second side surface 120 with respect to the bottom surface 130 in the direction of the central axis Xcenter may be smaller than an angle $\theta_1$ formed by the first side surface 111 with respect to the bottom surface 130 in the direction of the central axis Xcenter, i.e., the first side surface 111 may be arranged so as to be steeper than the second side surface 120 with respect to the bottom surface 130.

Further, as exemplarily shown in FIG. 8b, a region of the bottom surface 130 of the lens body corresponding to the bottom surface of the cavity may be open so that at least a part of the light source module 200 may be inserted into the cavity.

In FIG. 9a, a height $h_1$ from the bottom surface 130 of the lens body to the upper surface 112 of the lens body may be 1.8 to 2.2 times a height $h_2$ from the bottom surface 130 of the lens body to the highest point of the cavity, i.e., the discontinuous point $C_2$.

If a ratio of h1/h2 is less than 1.8, a space of the cavity into which the light source module 200 is inserted is excessively widened and thus optical loss may occur in the cavity, or a thickness from the second side surface 120 of the lens body to the upper surface 112 is excessively small and thus paths of light emitted by the light source module 200 may not be sufficiently changed and, even if an angle which will be described later, is 33 to 38 degrees, a proceeding region of light emitted by the lens may be narrowed, and, if the ratio of h1/h2 exceeds 2.2, the space of the cavity into which the light source module 200 is inserted is excessively narrowed or a size of the lens in the vertical direction is excessively increased and thus paths of light emitted by the light source module 200 may extend and optical loss may occur.

Further, a height $h_3$ from the bottom surface 130 to the light emitting surface of the light emitting device may be 32% to 48% of the height $h_2$ of the cavity.

If a ratio of h3/h2 is less than 0.32, the space of the cavity into which the light source module 200 is inserted is excessively widened and thus optical loss may occur in the cavity, or a volume of the light source module 200 inserted into the cavity is excessively decreased and thus, among light emitted by the light source module 200, a quantity of light proceeding to the upper surface 112 of the lens may be decreased and a quantity of light proceeding to the first side surface 111 may be increased. Further, if the ratio of h3/h2 exceeds 0.48, the size of the lens in the vertical direction is excessively increased and thus paths of light emitted by the light source module 200 may extend and optical loss may occur.

For example, the height $h_1$ from the bottom surface 130 of the lens body to the upper surface 112 of the lens body may be 5 mm, the height $h_2$ from the bottom surface 130 of the lens body to the discontinuous point $C_2$ of the cavity may be 2.50 mm, and the height $h_3$ from the bottom surface 130 of the lens body to the light emitting surface of the light source module 200 may be 1 mm.

A point, at which a line Xi connecting the central point $C_3$ of the light emitting surface of the light source module arranged in the cavity to the inflection part meets the inflection part, may be defined as 'i' and, in this case, an angle $\theta_i$ formed between the central axis Xcenter and the above-described line Xi may be 33 to 38 degrees, for example, be 35 degrees.

FIG. 10 is a top view of the light emitting unit of FIG. 9b and, for convenience of understanding, the inner surface 120 of the lens body and the light source module 200 are shown by dotted lines.

A maximum diameter $R_1$ of the outer surface of the lens may be greater than a maximum diameter $R_2$ of the inner surface of the lens corresponding to a maximum diameter of the cavity, for example, be 1.25 to 1.75 times the maximum diameter $R_2$. Further, a length $W_{31}$ of the light source module 200 in a first direction and a length $W_{32}$ of the light source module 200 in a second direction may be equal to each other and be smaller than the maximum diameter $R_2$ of the inner surface of the lens.

Further, the widths $W_{31}$ and $W_{32}$ of the light emitting surface of the light emitting device corresponding to the surface of the light source module may be 40% to 60% of the maximum diameter $R_2$ of the cavity and, for example, the widths $W_{31}$ and $W_{32}$ of the light emitting surface of the light emitting device may be 3 mm.

FIGS. 11a to 11j are views illustrating change in a portion provided with a pattern in a reflection region of the outer surface of the lens, FIGS. 12a to 12j are views illustrating light distributions in upper and lower regions of FIGS. 11a to 11j, and FIG. 12k is a view illustrating light distributions if no pattern is formed on the outer surface of the lens.

A pattern may be arranged in the entirety of the reflection region 110b of the outer surface of the lens, as exemplarily shown in FIG. 11a, or be arranged in a portion of the reflection region 110b of the outer surface of the lens, as exemplarily shown in FIGS. 11b to 11j.

As exemplarily shown in FIG. 11a, a pattern is arranged in the entirety of the reflection region 110b of the lens.

As exemplarily shown in FIGS. 11b to 11j, a pattern may be arranged in a portion of the reflection region 110b of the lens and, if the diameter of the outer surface of the lens 110b is '$R_1$', as exemplarily shown in FIG. 10, a length of a portion provided with the pattern in the horizontal direction may be $0.1R_1$ to $0.9R_1$.

Here, the above-described length within the range of $0.1R_1$ to $0.9R_1$ is not a length of the surface of the portion provided with the pattern but is a length of the cross-section of the portion provided with the pattern in the horizontal direction.

Further, as exemplarily shown in FIGS. 11b to 11j, the length of the portion, provided with the pattern, in the reflection region 110b in the horizontal direction may be $0.1R_1$ to $0.9R_1$, the length of the portion in the vertical direction may be fixed, for example, be '$h_1$' shown in FIG. 2a, without being limited thereto, and such a length will be described later with reference to FIGS. 13a to 13c.

When the pattern is arranged in the reflection region, as exemplarily shown in FIGS. 11a to 11j, among light emitted by the light source module, at least a part of light proceeding to the reflection region may be reflected by the pattern and, thus a ratio of light proceeding to the outside of the reflection region/light proceeding to the outside of the transmission region may be less than 1.

In FIGS. 12a to 12k, left views illustrate distributions of light proceeding to the upper regions in FIGS. 11a to 11j, and right views illustrate distributions of light proceeding to the lower regions. Here, 'upper region' and 'lower region' mean a region above a horizontal line and a region below the horizontal line, respectively, in FIGS. 11a to 11j.

In FIG. 12a, the pattern on the surface of the lens reflects light and a quantity of light emitted by the lens is mainly distributed in the upper region and, as the area of the pattern on the surface of the lens is decreased, as exemplarily shown FIGS. 12b to 12j, a quantity of light in the upper region and a quantity of light in the lower region gradually become similar to each other. In FIGS. 12a to 12j, a portion displayed in the deepest color, for example, in red, may have the highest illuminance and a portion displayed in the lightest color, for example, in blue, may have the lowest illuminance.

FIG. 12k illustrates that, if no pattern is formed on the outer surface of the lens, a quantity of light in the upper region and a quantity of light in the lower region are approximately equal to each other.

If lenses or light emitting units having the light distributions shown in FIGS. 12a to 12d are arranged such that lower reflection regions face a house side and upper transmission regions face a street side, light may be transmitted only to the street side and light transmitted to the house side may be blocked or a quantity thereof may be reduced.

FIGS. 13a to 13c are views illustrating pattern distribution ranges in the reflection region of the outer surface of the lens.

FIG. 13a is similar to FIG. 11d but a reflection region 110b provided with a pattern has a rectangular shape, and, in FIG. 13a, a horizontal length of the reflection region 110 may be $0.65R_1$ to $0.75R_1$ and a vertical length $L_1$-$L_2$ of the reflection region 110 may be 65% to 75% of the radius $R_{1/2}$ of the lens.

As compared to FIG. 11d, in FIG. 13a, no pattern may be arranged in a region from the lower end of the reflection region 110b to a height $L_2$. Even if no pattern is arranged in the region from the lower end of the reflection region 110b to the height $L_2$ shown in FIGS. 11a to 11j, light paths may be similar to those in FIGS. 11a to 11j. Here, the height $L_2$ of the region provided with no pattern may be 25% to 35% of the radius $R_{1/2}$ of the lens, and no pattern is arranged in the region having the height $L_2$ and thus does not significantly affect a quantity of light emitted to the outside of the lens.

FIG. 13b is similar to FIG. 11d but a pattern is arranged only in a region within a range of 60% to 70% of the diameter of the lens, i.e., $0.6R_1$ to $0.7R_1$, from the center of the lens and, even if no pattern is arranged in a region outside the above-described region, i.e., deviating from the range of $0.6R_1$ to $0.7R_1$ from the center, light paths may be similar to those in FIGS. 11a to 11j.

In FIG. 13c, a rectangular region shown in a solid line and a region provided with a pattern and shown in a dotted line do not coincide with each other. Due to a margin in a pattern formation process, both side edges of the pattern are spaced apart from vertical lines Xy and Xv by designated distances $L_3$ and $L_4$. Here, there may be little difference between light paths if the distances $L_3$ and $L_4$ are respectively 10% or less of a length $L_H$ of the pattern in the horizontal direction and light paths if a pattern is arranged in the rectangular region shown in the solid line.

Table 2 represents change in a ratio of light proceeding to the outside of the reflection region/light proceeding to the outside of the transmission region according to increase in the portion provided with the pattern, as exemplarily shown in FIGS. 11a to 11j, and FIG. 14 is a graph representing Table 2. In FIG. 14, the horizontal axis represents the length of the pattern in the horizontal direction, and the vertical axis represents the ratio of light proceeding to the outside of the reflection region/light proceeding to the outside of the transmission region.

TABLE 2

| Division | Length of pattern in vertical direction | Length of pattern in horizontal direction | Ratio of light proceeding to outside of reflection region/light proceeding to outside of transmission region |
|---|---|---|---|
| FIG. 8a | 0 | 0 | 1.00052 |
| FIG. 11a | 100% | 100% | 0.657167 |
| FIG. 11b | 100% | 90% | 0.656868 |
| FIG. 11c | 100% | 80% | 0.659242 |
| FIG. 11d | 100% | 70% | 0.680722 |
| FIG. 11e | 100% | 60% | 0.713658 |
| FIG. 11f | 100% | 50% | 0.748497 |
| FIG. 11g | 100% | 40% | 0.792292 |
| FIG. 11h | 100% | 30$ | 0.843908 |
| FIG. 11i | 100% | 20% | 0.898898 |
| FIG. 11j | 100% | 10% | 0.951805 |

The lens shown in FIG. 1a is provided with no pattern and thus a quantity of light proceeding to the outside of the reflection region and a quantity of light proceeding to the outside of the transmission region are approximately equal to each other.

It may be understood that, when the lengths of the portions provided with a pattern in the reflection regions 110b of the lenses shown in FIGS. 11a to 11d are $0.7R_1$ to $0.9R_1$, a quantity of light proceeding to the outside of the reflection region is 70% or less than a quantity of light proceeding to the outside of the transmission region.

If a lens or a light emitting unit having the above-described structure is arranged such that a reflection region faces a house side and a transmission region faces a street side, a quantity of light transmitted to the house side may be less than 70% of a quantity of light transmitted to the street side due to action of a pattern arranged in the reflection region of the lens and, thus, the lens or the light emitting unit may be used as a streetlamp.

Further, if the lens or the light emitting unit having the above-described structure is used as a security light, the lens or the light emitting unit may concentrate light on some area of a specific region. Although the preferred embodiments have been disclosed for illustrative purposes, those skilled in the art will appreciate that various modifications, applications, additions and substitutions are possible, without departing from the scope and spirit of the disclosure. For example, respective elements of the embodiments may be modified. Further, it should be understood that differences regarding the modifications and applications are within the spirit and scope of the disclosure which is defined by the appended claims and their equivalents.

INDUSTRIAL APPLICABILITY

A lens and a light emitting unit including the same in accordance with one embodiment may be used as, for example, a streetlamp.

The invention claimed is:
1. A lens comprising:
a lens body; and
a cavity disposed in the lens body,
wherein an outer surface of the lens body comprises a first side surface sloping toward a central axis at an acute angle with respect to a bottom surface of the lens body, an upper surface comprising a flat area, and an inflection part disposed between the first side surface and the upper surface, and
wherein the cavity comprises a second side surface sloping toward the central axis at an acute angle with respect to the bottom surface.
2. The lens according to claim 1, wherein the inflection part has a curved cross-section.
3. The lens according to claim 1, wherein the second side surface forms a curved surface toward the central axis.
4. The lens according to claim 3, wherein the second side converges in an upper region of the cavity, and the curved surface with curvature has a discontinuous point in a convergence region of the second side surface.
5. The lens according to claim 1, wherein an angle formed by the second side surface in the direction of the central axis with respect to the bottom surface is smaller than an angle formed by the first side surface in the direction of the central axis with respect to the bottom surface.
6. The lens according to claim 1, wherein a region of the bottom surface of the lens body corresponding to a bottom surface of the cavity is open.

7. The lens according to claim 1, wherein a height from the bottom surface of the lens body to the upper surface of the lens body is 1.8 to 2.2 times a height from the bottom surface of the lens body to a highest point of the cavity.

8. The lens according to claim 1, wherein a line connecting a central point of a light emitting surface of a light source arranged in the cavity to the inflection part is inclined at an angle of 33 degrees to 38 degrees with respect to the central axis.

9. The lens according to claim 1, wherein a maximum diameter of the outer surface of the lens body is 1.25 times to 1.75 times a maximum diameter of the cavity.

10. The lens according to claim 1, wherein the bottom surface and the upper surface of the lens body are arranged in parallel.

11. A lens comprising:
a lens body; and
a cavity disposed in the lens body,
wherein an outer surface of the lens body comprises a first side surface sloping toward a central axis at an acute angle with respect to a bottom surface of the lens body, an upper surface comprising a flat area, and an inflection part disposed between the first side surface and the upper surface,
wherein the outer surface of the lens body comprises a reflection region and a transmission region, and a pattern is arranged in the reflection region, and
wherein the pattern is located to cover at least a portion of the flat area and does not encircle the cavity about the central axis.

12. The lens according to claim 11, wherein the reflection region and the transmission region are symmetrical to each other about a vertical direction of the lens body.

13. The lens according to claim 11, wherein the pattern is carved in relief or in intaglio on the outer surface of the lens body.

14. The lens according to claim 11, wherein, when a diameter of the outer surface of the lens body is defined as $R_1$, a horizontal length of a cross-section of a portion, provided with the pattern, of the reflection region is $0.7R_1$ or more.

15. A light emitting unit comprising:
a lens comprising a lens body and a cavity disposed in the lens body, an outer surface of the lens body comprising a first side surface sloping toward a central axis at an acute angle with respect to a bottom surface of the lens body, an upper surface comprising a flat area, and an inflection part disposed between the first side surface and the upper surface; and
a light source module arranged in the lens,
wherein the cavity comprises a second side surface sloping toward the central axis at an acute angle with respect to the bottom surface, and
wherein the light source module comprises a circuit board and a light emitting device, and a light emitting surface of the light emitting device is placed within the cavity.

16. The light emitting unit according to claim 15, wherein, when light emitted by the light source module is incident on the upper surface, an angle formed by the light emitted by the light source module with respect to the central axis is smaller than an angle formed by light emitted to the outside through the outer surface of the lens with respect to the central axis.

17. The light emitting unit according to claim 15, wherein, when light emitted by the light source module is incident on the side surface, an angle formed by the light emitted by the light source module with respect to the central axis is greater than an angle formed by light emitted to the outside through the outer surface of the lens with respect to the central axis.

18. The light emitting unit according to claim 15, wherein widths of the light emitting surface of the light emitting device are 40% to 60% of a maximum diameter of the cavity.

19. The light emitting unit according to claim 15, wherein a height from the bottom surface to the light emitting surface of the light emitting device is 32% to 48% of a height of the cavity.

20. The light emitting unit according to claim 15, wherein the outer surface of the lens body further comprises a reflection region and a transmission region, and a pattern is arranged in the reflection region.

* * * * *